(12) United States Patent
Kitajima et al.

(10) Patent No.: US 7,652,715 B2
(45) Date of Patent: Jan. 26, 2010

(54) PHOTOGRAPHING APPARATUS WITH IMPROVED SYSTEM INITIALIZATION AND MOVEMENT OF OPTICAL SYSTEM

(75) Inventors: Tatsutoshi Kitajima, Ohta-ku (JP); Makoto Kanehiro, Ohta-ku (JP); Yoshihiro Mitekura, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 1202 days.

(21) Appl. No.: 10/636,849

(22) Filed: Aug. 8, 2003

(65) Prior Publication Data
US 2004/0056974 A1 Mar. 25, 2004

(30) Foreign Application Priority Data

| Aug. 8, 2002 | (JP) | 2002-232175 |
| Aug. 9, 2002 | (JP) | 2002-233664 |
| Aug. 9, 2002 | (JP) | 2002-233665 |

(51) Int. Cl.
*H04N 5/232* (2006.01)
(52) U.S. Cl. ...................................... 348/347
(58) Field of Classification Search ................. 348/347, 348/345, 357, 240.99, 240.3, 349, 356
See application file for complete search history.

(56) References Cited

U.S. PATENT DOCUMENTS

| 4,857,908 A | 8/1989 | Kogure et al. |
| 4,916,547 A | 4/1990 | Katsumata et al. |
| 5,109,249 A | 4/1992 | Kitajima |
| 5,229,805 A | 7/1993 | Kitajima |
| 5,424,809 A | 6/1995 | Sawayama et al. |
| 5,485,246 A | 1/1996 | Hayashi et al. |
| 5,510,876 A | 4/1996 | Hayashi et al. |
| 5,546,164 A | 8/1996 | Hayashi et al. |
| 5,682,563 A | 10/1997 | Shinohara et al. |
| 5,694,201 A | 12/1997 | Hayashi et al. |
| 5,748,233 A | 5/1998 | Kitajima et al. |
| 5,784,663 A | 7/1998 | Hayashi et al. |
| 5,797,067 A | 8/1998 | Mitekura |
| 5,808,681 A | 9/1998 | Kitajima |
| 5,862,430 A | 1/1999 | Mitekura et al. |
| 5,887,217 A | 3/1999 | Mitekura et al. |

(Continued)

FOREIGN PATENT DOCUMENTS

JP 2000-209485 * 7/2000

*Primary Examiner*—Jason Chan
*Assistant Examiner*—Nicholas G Giles
(74) *Attorney, Agent, or Firm*—Oblon, Spivak, McClelland, Maier & Neustadt, L.L.P.

(57) ABSTRACT

A photographing apparatus includes an imaging optical system to guide light from a subject, a movement mechanism to move the imaging optical system, a sub control section to move the imaging optical system toward a predetermined position with the aid of the movement mechanism when a power supply is turned on, and a main control section to execute system initialization when the power supply is turned on, and to move the imaging optical system with the aid of the movement mechanism and interrupt the movement of the imaging optical system at the predetermined position. The sub control section may also start a lens barrel initialization processing to drive the lens barrel from a non-photographing position to a photographing standby position while the main control section executes system initialization, and the main control section may drive the lens barrel to the photographing standby position after the system initialization is finished.

24 Claims, 22 Drawing Sheets

U.S. PATENT DOCUMENTS

| | | |
|---|---|---|
| 5,937,100 A | 8/1999 | Kitajima |
| 6,075,562 A | 6/2000 | Sakaguchi et al. |
| 2001/0012074 A1* | 8/2001 | Ohkawara .................. 348/358 |
| 2002/0018140 A1* | 2/2002 | Suemoto et al. ............. 348/358 |

* cited by examiner

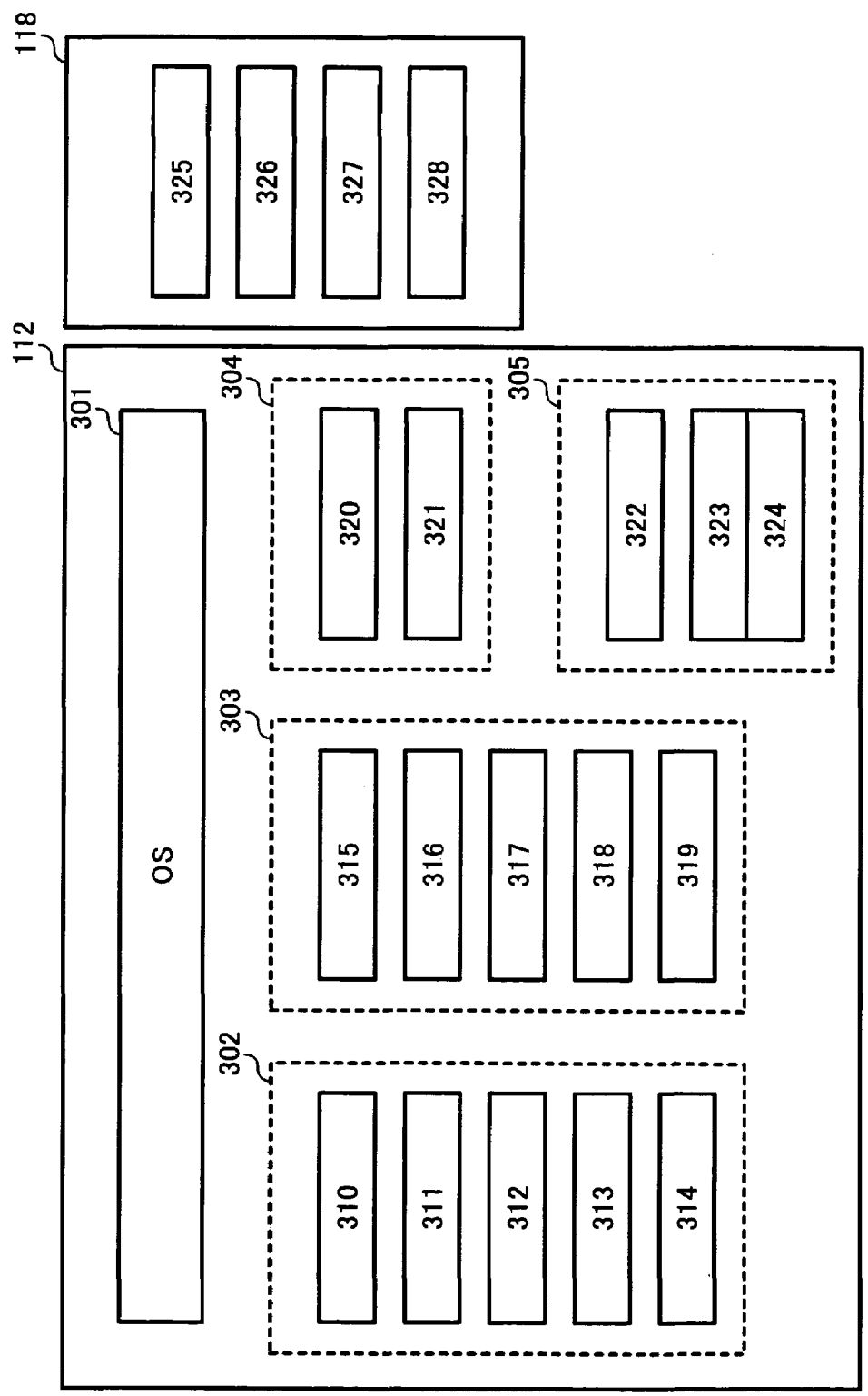

FIG. 4

| RESULT OF SUB-CONTROL SECTION | ZOOM POSITION SENSOR | FOCUS POSITION SENSOR | CONTENTS OF EXECUTION BY MAIN CONTROL SECTION |
|---|---|---|---|
| OPERATION OK | – | – | REMAINING DRIVE OF SUB-CONTROL SECTION |
| NOT OPERATED | OFF | OFF | SINGLE DRAWING-OUT |
| NOT OPERATED | OFF | ON | 1. FOCUSING MOVED TO AN INSIDE POSITION<br>2. ZOOM MOVED TO A PHOTOGRAPHING STANDBY POSITION<br>3. FOCUSING MOVED TO A PHOTOGRAPHING STANDBY POSITION |
| NOT OPERATED | ON | OFF | 1. ZOOM MOVED TO AN INSIDE POSITION<br>2. ZOOM MOVED TO A PHOTOGRAPHING STANDBY POSITION<br>3. FOCUSING MOVED TO A PHOTOGRAPHING STANDBY POSITION |
| NOT OPERATED | ON | ON | 1. FOCUSING MOVED TO AN INSIDE POSITION<br>2. ZOOM MOVED TO AN INSIDE POSITION<br>3. ZOOM MOVED TO A PHOTOGRAPHING STANDBY POSITION<br>4. FOCUSING MOVED TO A PHOTOGRAPHING STANDBY POSITION |

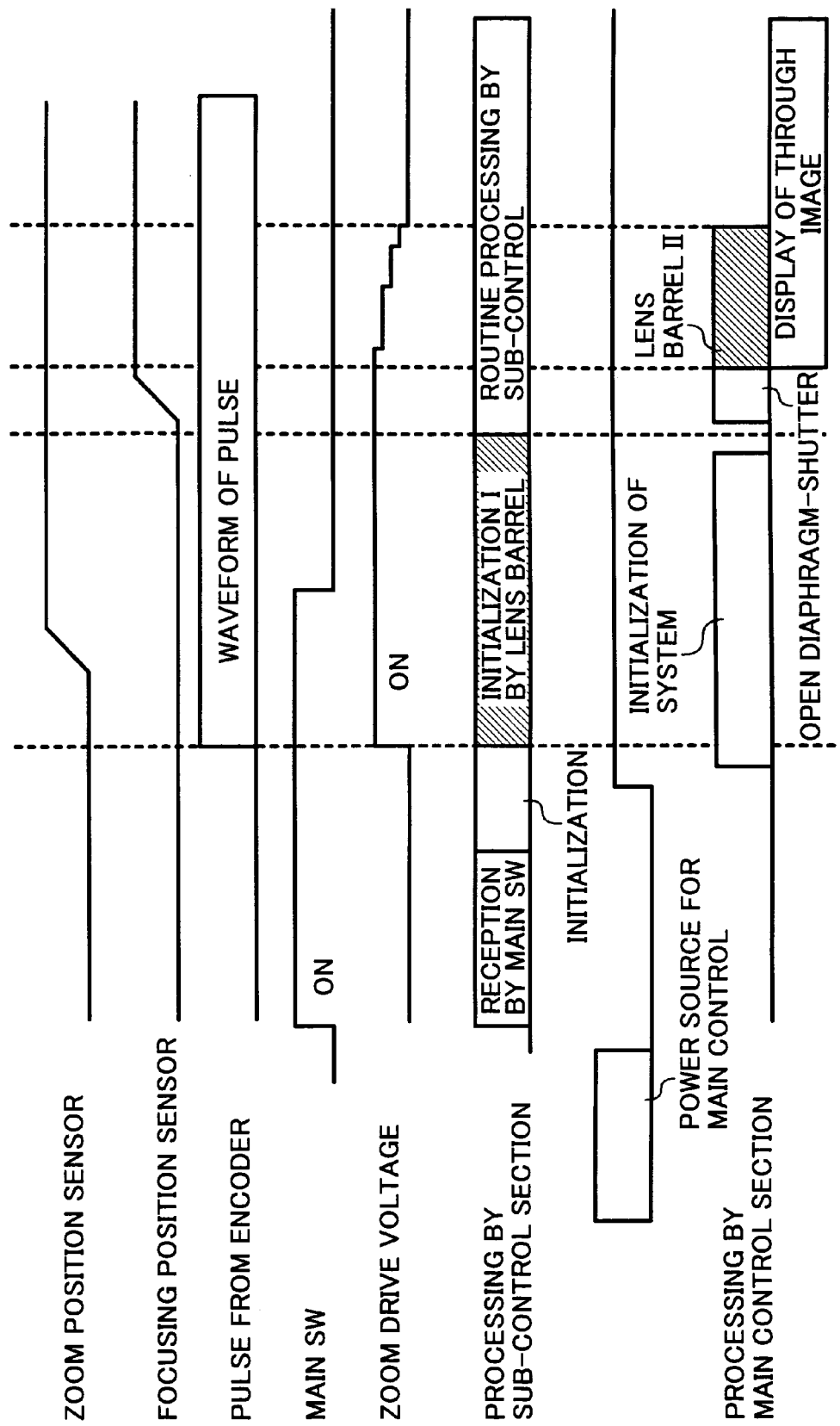

PHOTOGRAPHING APPARATUS WITH IMPROVED SYSTEM INITIALIZATION AND MOVEMENT OF OPTICAL SYSTEM

BACKGROUND OF THE INVENTION

1. Field of the Invention

The present invention relates to a photographing apparatus which is adapted to move an imaging optical system or a lens barrel for guiding light from a subject, and which is preferable for use in a digital camera.

2. Description of the Prior Art

Recently, a photographing apparatus carrying out an electronic control such as a digital camera and a digital still camera has a high function and a multifunction. A control section in the photographing apparatus may execute a complicated control owing to the high function and multifunction. For achieving the complicated control there is manufactured a photographing apparatus in which an OS or operating system for an assembled instrument is mounted and a control section therein executes such a complicated operation.

Usually, several hundreds of m-sec are required for initialization of an OS or operating system and a relatively long period of time is required for starting of the OS. Such high function/multifunction cause an increase of the number of devices such as memories, objects of the initialization, so that the time required for such initialization is likely to be lengthened. A photographing apparatus carrying an OS thus suffers disadvantageously from a longer starting time until the apparatus becomes actually useable after a power supply is turned on.

In a photographing apparatus, in which a mechanical movement is executed such that a lens barrel is drawn out from a settled state being an accommodated state after the OS is initialized and the control proceeds to a photographing standby state, the initialization must be performed prior to the lens barrel being drawn out, so that the starting time is further lengthened.

The lens barrel includes a lens disposed therein and constituting the imaging optical system.

To solve the difficulty, Japanese Patent Laid-Open No. 2000-209485, for example, discloses that in addition to a main control section for controlling the whole of an apparatus by executing an OS there is mounted a sub control section for executing in parallel drawing-out of a power supply, a zoom, a lens barrel, etc., in the course of the starting of the main control section, whereby there is a reduction in the starting time since a power supply button is turned on.

When the main control section and the sub control section share their role, in view of the effect of a development work, it is desirable for improving the efficiency of the development of a product to share the works into a high function, a high-speed control function, and a simple work function.

The reason is that the debugging of software and the construction of a program can be concentratedly executed for the one control section, and a CPU containing an inexpensive mask ROM is employed for the other control section to reduce the manufacturing cost.

Particularly, in recent years a high magnification for an optical system of a camera is required, while the miniaturization of a camera is required together with the improvement of control accuracy required, so that the use of an expensive CPU for both control sections disadvantageously brings about a too expensive product in itself.

More specifically, owing to the miniaturization of a photographing apparatus, accuracy required for position control in drawing out a lens barrel has been increased. For realizing such higher position control accuracy, an expensive CPU with a high processing capability should be employed for the main control section. Use of an expensive CPU causes a significant rise of the manufacturing cost, resulting in a prior art photographing apparatus with the significant higher manufacturing cost.

Particularly, in a photographing apparatus which should execute initialization of a lens barrel, there are particularly required the reduction of a burden exerted on the development cost, an improvement of position control accuracy for a lens barrel, and the shortening of the starting time.

Additionally, it is common that the control section suffers from a relatively large electric power consumption. Because of this, a prior art apparatus including two control sections thereon is likely to have shortened operable time, compared with a photographing apparatus including only one control section, in a case where a battery having the same charging capacity is used in those apparatuses. It is therefore required to suppress overall consumed electric power and lengthen the foregoing operable time.

SUMMARY OF THE INVENTION

In view of the drawbacks with the prior art, it is a main object of the present invention to provide a photographing apparatus capable of ensuring an improvement of the efficiency of the development of a product, the reduction of the manufacturing cost, and the shortening of the starting time.

It is another object of the present invention to provide a photographing apparatus including two control sections each driven with less electric power consumption.

It is further another object of the present invention to provide a photographing apparatus, which is capable of displaying a photographed slow picture image at an early time in the state where gradation is not severe, and in which an operation feeling of a power switch or main switch is improved.

It is still further another object of the present invention to provide a photographing apparatus capable of further shortening the time required for starting.

Other objects of the present invention are to provide a photographing apparatus capable of substantially shortening the time until initialization of a lens barrel is finished by advancing the time of starting of the initialization of the lens barrel to provide a general-purposed photographing apparatus capable of easily dealing with the alteration of parameters without such a fixed control parameter as recorded in a ROM possessed by a sub-control section, to provide a photographing apparatus to enable the initialization of the lens barrel to be started independently of the advance of the initialization by the main control section, and provide a high speed starting photographing apparatus, in which the main control section can alter at need a control parameter for controlling the lens barrel initialization by the sub-control section, whereby the control parameter for controlling the lens barrel initialization processing can be updated in response to a result of surveying over the entire system including the consideration of a residual amount of a power supply cell for example by the main control section, and stable operation is ensured whatever use environment and use conditions are.

Further other objects will become apparent from the following description.

To achieve the above objects according to a first aspect of the present invention, a photographing apparatus including an imaging optical system to guide light from a subject and a movement mechanism to move the imaging optical system comprises a main control section to move the foregoing imaging optical system to a predetermined position with the aid of the foregoing movement mechanism when a power supply is turned on, and a sub control section to further move the imaging optical system moved by the main control section with the movement mechanism, and stopping the same at the predetermined position.

In one embodiment, the photographing apparatus is adapted for the main control section to move the imaging optical system toward the predetermined position at a predetermined speed, and the sub control section to move the imaging optical system while changing the movement speed of the imaging optical system.

In one embodiment, the photographing apparatus includes a position detection section for detecting the position of the imaging optical system.

In one embodiment, the photographing apparatus is adapted for the main control section to judge whether or not the imaging optical system should be moved on the basis of the position of the imaging optical system detected by the position detection section, and to move the imaging optical system following the result of the judgment with the aid of a moving mechanism.

In one embodiment, the photographing apparatus is adapted for the sub control section to further move the imaging optical system moved by the main control section with the aid of the movement mechanism after the position of the imaging optical system detected by the position detection section reaches its state where the position is not changed more.

In one embodiment, the photographing apparatus is adapted for the main control section to judge whether or not the imaging optical system should be moved on the basis of the position detected by the position detection section when a power supply is turned on, and for the sub control section to move the imaging optical system with the aid of the movement mechanism in response to the result of the judgment of the main control section and stop the same at the predetermined position.

In one embodiment, according to the photographing apparatus, when the power supply is turned on, the imaging optical system is moved toward the predetermined position with the aid of the main control section, and is further moved and is stopped at the predetermined position with the aid of the sub control section.

In one embodiment, according to the photographing apparatus, the main control section and the sub control section are adapted to share the role of moving the lens barrel, so that the main control section is adapted to bear a relatively simple initialization processing upon the initialization processing for the lens barrel, and the sub control section to bear a complicated processing with accuracy. This results in the facilitation of the development of an execution program.

More specifically, the details of the control to be executed by the main control section are simplified stopping the imaging optical system at the predetermined position with the aid of the sub control section, and hence the accuracy required for the position control is reduced. For these reasons it is possible to adopt an inexpensive CPU for the main control section. Further, the development of a program to be executed by the main control section is facilitated. The starting time when the power supply is turned on is shortened because the main control section moves the imaging optical system. These results cause the manufacturing cost of the photographing apparatus to be reduced, and the starting time upon the power supply being turned on to be shortened.

When the sub control section further moves the imaging optical system moved by the main control section after the imaging optical system reaches its state where its position does not change, it is always possible to accurately get the position for assurance of highly accurate position control of the imaging optical system.

When the main control section is adapted not to move the imaging optical system depending upon the position of the imaging optical system, the details of the control executed by the main control section are simplified.

In one embodiment, the photographing apparatus includes a third control section which starts the drive of the position detection section by the power supply being turned on, and interrupts the drive at once after the conditions with which the imaging optical system should be moved are found not to be satisfied.

In one embodiment, the photographing apparatus is adapted for the sub control section to start the drive of the position detection section by the power supply being turned on, and interrupt the drive after the conditions under which the imaging optical system should be moved are found not to be satisfied.

In one embodiment, the photographing apparatus is adapted for the sub control section to temporarily interrupt the drive of the position detection section until the movement of the imaging optical system is started when conditions are found to be satisfied until the movement of the imaging optical system by the main control section is finished.

In one embodiment, the photographing apparatus is adapted for the imaging optical system to include a zoom lens and a focusing lens movable by the movement mechanism, and for the sub control section to move the zoom lens after the movement of the focusing lens is finished.

In one embodiment, the photographing apparatus is adapted for conditions to be that a photographing mode is designated by an operation switch.

In one embodiment, the photographing apparatus is adapted for the imaging optical system to include a zoom lens and a focusing lens, and for the sub control section to complete the movement of the zoom lens and the focusing lens to predetermined positions with the aid of the movement mechanism in the order of the focusing lens and the zoom lens when the power supply is turned on.

In one embodiment, according to the photographing apparatus of the present invention, the position detection section for detecting the position of the imaging optical system is started in its drive by the power supply being turned on, and interrupts the drive just after the conditions under which the imaging optical system should be moved are found not to be satisfied. It is possible to drive the position detection section only by a time interval it should be driven by performing on/off control for the position detection section as described above. Consumed electric power in the whole of the photographing apparatus is therefore reduced.

When the drive of the position detection section is temporarily interrupted until the movement of the imaging optical system by the sub control section is started since the movement of the imaging optical system by the main control section is finished in the case where the conditions are found to be satisfied, electric power consumption is more reduced. When, in the case of the imaging optical system including a movable zoom lens and focusing lens, the zoom lens is moved after the movement of the focusing lens is finished, if the photographing apparatus is one for treating picture image data such as a digital camera, a focused picture image is displayed in an early time.

According to a second aspect of the present invention, in a photographing apparatus to convert photographed image data of a subject to digital data, the photographing apparatus comprises a main control section to control the whole of the apparatus, an imaging device to image a subject, a lens barrel section to hold a lens to image the subject onto the imaging device and take different positions upon non-photographing and upon standby for photographing, an imaging section to convert a subject picture image data signal outputted from the imaging device to a digital data signal, a digital picture image processing section to convert an image data signal to a video signal, a sub-control section connected to the main control section for delivering information between itself and the main control section, a lens barrel position detection section to detect the position information of the lens, and a switch section connected to the main control section or the sub-control section.

When a power supply switch of the switch section is turned on, the main control section drives the lens barrel to the photographing standby state after the first lens barrel initialization processing for driving the lens barrel from the non-photographing state to the photographing standby state side by the sub-control section is started.

In one embodiment, the photographing apparatus is adapted for the main control section to detect the position information of the lens barrel by the drive of the sub-control section, and execute a second lens barrel initialization processing for driving the lens barrel to the photographing standby state based upon the position information of the lens barrel.

In one embodiment, the photographing apparatus is adapted for the main control section to be informed of the result of initialization drive containing the position information of the lens barrel from the sub-control section after the finish of the system initialization, and execute a second lens barrel initialization processing for driving the lens barrel till the photographing standby state based upon the informed position information of the lens barrel.

In one embodiment, the photographing apparatus is adapted for the sub-control section to include a drive control section to drive the lens barrel from the non-photographing state to the photographing standby state as the first lens barrel initialization processing section, and not execute the first lens barrel initialization processing section when the position state of the lens barrel detected at the time the power supply switch of the switch section is turned on is not existent at a predetermined position.

In one embodiment, the photographing apparatus is adapted for the lens barrel section to include an aperture or a shutter to control the amount of exposure to light of a subject, and bring about the aperture or the shutter to the photographing standby state between the first lens barrel initialization processing by the sub-control section and the second lens barrel initialization processing by the main control section.

In one embodiment, the photographing apparatus is adapted to be capable of simultaneously executing the first lens barrel initialization processing and the second lens barrel initialization processing in the course of the operation, and is adapted for the sub-control section to change over the operation from the first lens barrel initialization processing by the sub-control section to the second lens barrel initialization processing by the main control section while the first lens barrel initialization processing is executed.

In one embodiment, the photographing apparatus is adapted for the main control section to judge the switch state of the switch section when the power supply switch of the switch section is thrown, and instruct the sub-control section to execute the first lens barrel initialization processing upon the switch state being a photographing mode, and thereafter start the execution of the system initialization.

In one embodiment, the photographing apparatus is adapted for the sub-control section to receive a control parameter from the main control section, for controlling the first lens barrel initialization processing by the sub-control section.

In one embodiment, the photographing apparatus is adapted for the sub-control section to confirm the switch state of the switch section following a parameter held in the sub-control section just after the power supply switch of the switch section is thrown, and start the execution of the first lens barrel initialization processing only when the result of the confirmation is the photographing mode.

A photographing apparatus is adapted for the main control section to change the control parameter to control the first lens barrel initialization processing by the sub-control section when needed.

In one embodiment, according to the photographing apparatus, it is possible, additionally to the reduction of the development cost, to shorten the time required for the starting, and to secure the accuracy of zoom interruption, and further make the cost inexpensive, resulting in high speed starting.

The photographing apparatus makes it possible to reduce the cost, shorten the time required for the starting, and secure the accuracy of the zoom interruption.

The photographing apparatus makes it possible to display a photographed slow image in the state with non-severe gradation in an early time, and improve the feeling of the operation of the power supply switch or main switch.

According to the photographing apparatus, since the first lens barrel initialization processing and the second lens barrel initialization processing can be simultaneously executed, the sub-control section changes over the execution of the control section to control the lens barrel to the second lens barrel initialization processing by the main control section while the sub-control section executes the first lens barrel initialization processing, so that it is possible to eliminate an interruption time interval of the lens barrel required upon the lens barrel initialization processing from the sub-control section to the main control section, and hence further shorten the time required for starting.

According to the photographing apparatus of the present invention, the main control section judges the switch state of the switch section when the power supply switch is turned on, and as a result, when the switch state indicates the photographing mode, instructs the sub-control section to execute the first lens barrel initialization processing, and thereafter since the execution of the system initialization is started, advances the starting time for the initialization of the lens barrel to substantially shorten the time till the finish of the initialization of the lens barrel.

According to the photographing apparatus, the sub-control section receives the control parameter to control the first lens barrel initialization processing by the sub-control section from the main control section, so that it can serve a general purpose, and deal with the alteration of the parameter without permitting the sub-control section to possess such fixed control parameter recorded in a ROM.

According to the photographing apparatus, the sub-control section confirms the switch state of the switch section following the parameter held in the sub-control section just after the power supply switch of the switch section is thrown, and starts execution of the first lens barrel initialization processing only when the result of the confirmation is the photographing mode, so that the initialization of the lens barrel can be started independently of the advancement of the initialization by the main control section.

In the photographing apparatus, the main control section alters the control parameter to control the first lens barrel initialization processing by the sub-control section at need, so that a more flexible system can be constructed, and particularly a stable operation is assured irrespective of use environments and conditions.

BRIEF DESCRIPTION OF THE DRAWINGS

FIG. 3 is a view illustrating the construction of a program for the main control section and the sub-control section;

FIG. 4 is a table showing for every condition the details of an operation of the main control section drawing out the lens barrel when the power supply is turned on;

FIG. 7 is a timing chart illustrating the operation of each portion of the photographing apparatus when the power supply is turned on;

FIG. 18 is a view for describing the embodiment 2 of the present invention, a timing chart illustrating the operation of each section of the photographing apparatus when the power source is turned on;

FIG. 22 a view describing the modified example of the embodiment 2 of the present invention, a timing chart illustrating the operation of each section of the photographing apparatus when the power source is turned on.

DETAILED DESCRIPTION OF THE PREFERRED EMBODIMENTS

What follows, is a description of preferred embodiments of the present invention with reference to the accompanying drawings.

Preferred Embodiment 1

Figure 1:
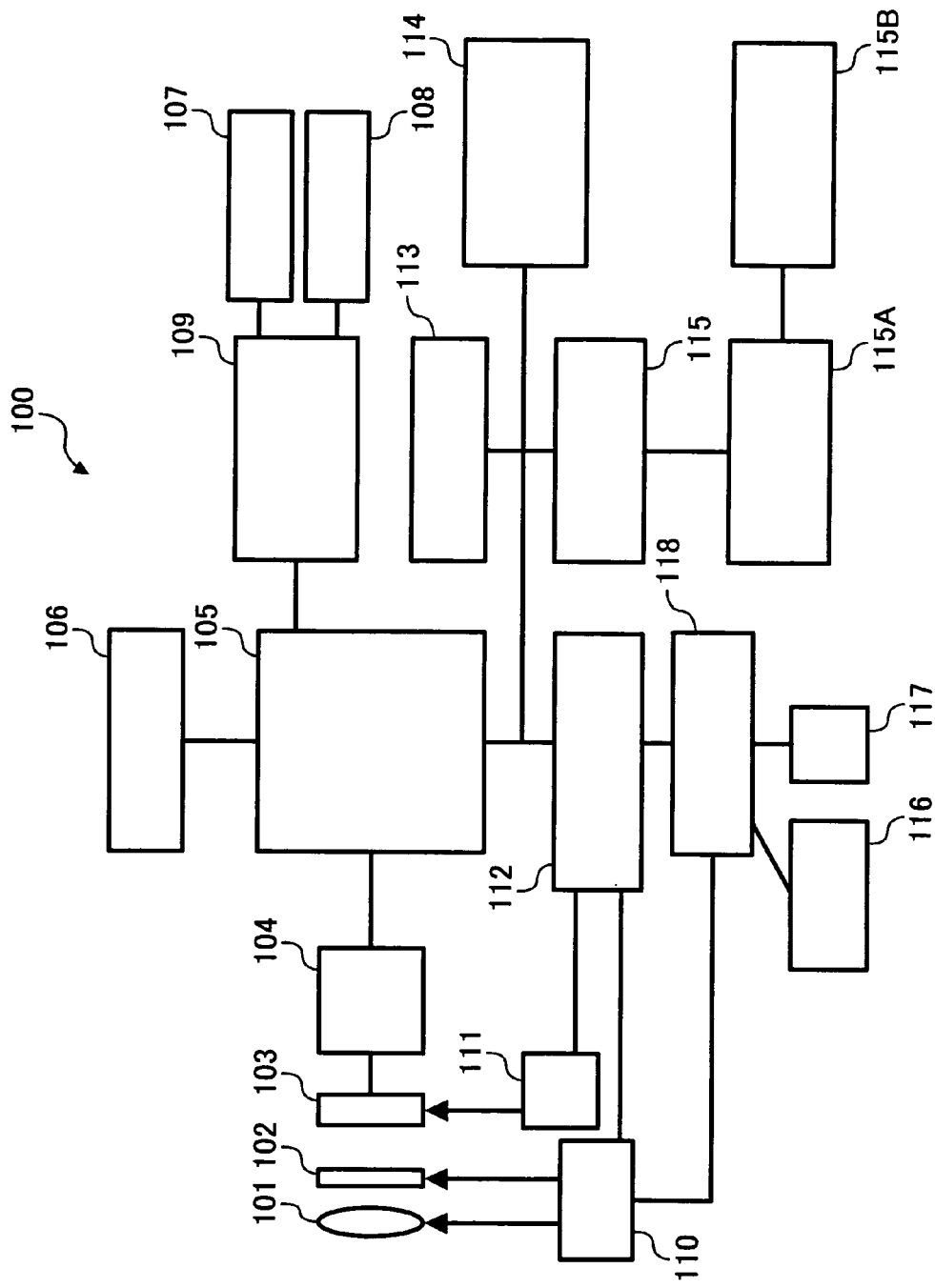
FIG. 1 is a view illustrating the construction of a photographing apparatus according to an embodiment 1 of the present invention.

Referring to FIG. 1, there is provided a view illustrating a photographing apparatus or camera according to the present embodiment.

The photographing apparatus 100 substantially comprises a lens system 101, a mechanical shutter 102, a charge coupled device 103, hereinafter, referred to as a CCD, a sampling section 104, a DSP section 105, a display section 106, an input analog section 107, an output analog section 108, a voice CODEC section 109, a driver section 110, a CCD drive circuit section 111, a main control section or a sub control section 112, a memory 113, a memory card I/F or an interface 114, a communication driver section 115, a power source section 116, a switch section 117, and a sub-control section or main control section 118. The lens system 101 includes a lens barrel 200 for integrally holding a focusing lens 201 and a zoom lens illustrated in FIG. 2, a mechanical movement mechanism 203 for moving the focusing lens 202, and a mechanical movement mechanism 204 for moving a zoom lens. The lens system 101 serves as an imaging optical system for guiding light from a subject to the CCD 103. The shutter 102 serves to open/close a camera, and the CCD 103 converts light to an electric signal.

The sampling section 104 subjects an analog electric signal outputted from the CCD 103 to correlation double sampling to convert the analog signal to a digital signal or a digital image data, and output it. The DSP section 105 subjects the image data to a predetermined processing.

The display section 106 comprises a display controller and a display screen section, and the display controller converts the image data to a signal capable of LCD display, and displays the image on the display screen section. An external apparatus 115A is an apparatus for supporting a camera body, which charges the camera body with electricity and is used instead of a display action of the display section 106. When the external apparatus 115A includes a display section, the display section 106 is not required. The external apparatus 115B is an instrument connectable to the external apparatus 116A, e.g., a personal computer.

The voice CODEC section 109 converts an analog voice signal to a digital voice signal and outputs it to the DSP section 105, and converts the digital, voice signal outputted from the DSP section 105 to an analog voice signal, and outputs it to the output analog section 108.

The driver section 110 drives the lens system 101 and the mechanical shutter 102. More specifically, the driver section 110 acts for zoom focusing drive and shutter opening/closing drive. The CCD drive section 111 drives the CCD 103. The main control section 112 executes overall control for a camera system of the apparatus 100. The memory 113 is used when the DSP section 105 and the main control section 112 execute a relevant processing. More specifically, image data and data read from a file obtained by imaging are temporarily stored in the memory 113.

The memory card I/F 114 is used upon accessing to a removable memory card (not shown) to the apparatus 100. Image data photographed by the apparatus 100 is recorded in the memory card as a card medium through the memory card I/F 114, and image data or file data recorded in the memory card is read into the apparatus 100 through the memory card IF 114.

The communication driver section 115 executes communication between the external apparatuses 115A, 115B connected to the camera body as external systems. The power source section 116 is a commercially available cell for example. The switch section 117 includes a main switch operable by a user and other various switches. The state of the switch section 117 is transmitted to the sub-control section 118. The sub-control section 118 executes independently of the main control section 112 detection of SW inputting, state detection of the switch section 117, on/off of the power source, and control of the drive 110.

In the following, there will be described an outline of the operation in the construction described above.

Electric power is supplied at all times from the power source section 116 to the sub-control section 118. The sub-control section 118 executes on/off operation (supply of a current to the main control section 112, and interruption thereof) in response to the operation of the main switch of the switch section 117.

When the power source is turned on, the lens system 101 is driven by the driver section 110 to draw a lens barrel in an accommodated state. Various switches constituting the switch section 117 detect the state of the lens barrel, and inform the main control section 112 of a detection result by proper scanning.

The photographing apparatus 100 includes as operation modes a photographing mode for executing photographing, a regeneration mode for viewing a photographed image, a SETUP mode for various setup operations or SETUP, and a communication mode for communication between the external apparatuses 115A, 115B, etc. Setting of these operation modes is achieved by changing the position of the mode changeover switch of the switch section 117.

The main control section 112, once informed of the state of each switch from the sub-control section 118, analyses the state to specify a switch where its state is changed, and executes a processing corresponding to the specified switch and details of the state change. Hereby, the photographing apparatus 100 is operated or various settings are executed in response to the operation of the switch of the switch section 117.

When the photographing mode is set, it is achieved by operating the switch section 117 by a user. Upon the photographing mode once a user operates a shutter button in the switch section 117, the main control section 112 drives the shutter 102 through the driver section 110. Thereby, light from a subject is incident on the CCD 103. The DSP section 105 executes a processing for image data outputted from the sampling section 104. The processed data is stored in the memory 113. The main control section 112 sends the image data stored in the memory 113 to the memory card I/F 114. The image stored in the memory 113 is stored in the memory card (not shown).

When the regeneration mode is set, a user operates the switch section 117 to instruct the regeneration of the image data. Thereupon, the main control section 112 instructs the memory card I/F 2114 to read the image data instructed to be regenerated from the memory card. The read data is transferred to the DSP section 105. The DSP section 105 generates image data for display from the image data, and outputs it to the display section 106. Thereby, the image data adapted to instruct re-generation by a user is displayed on the display section 106.

Figure 2:
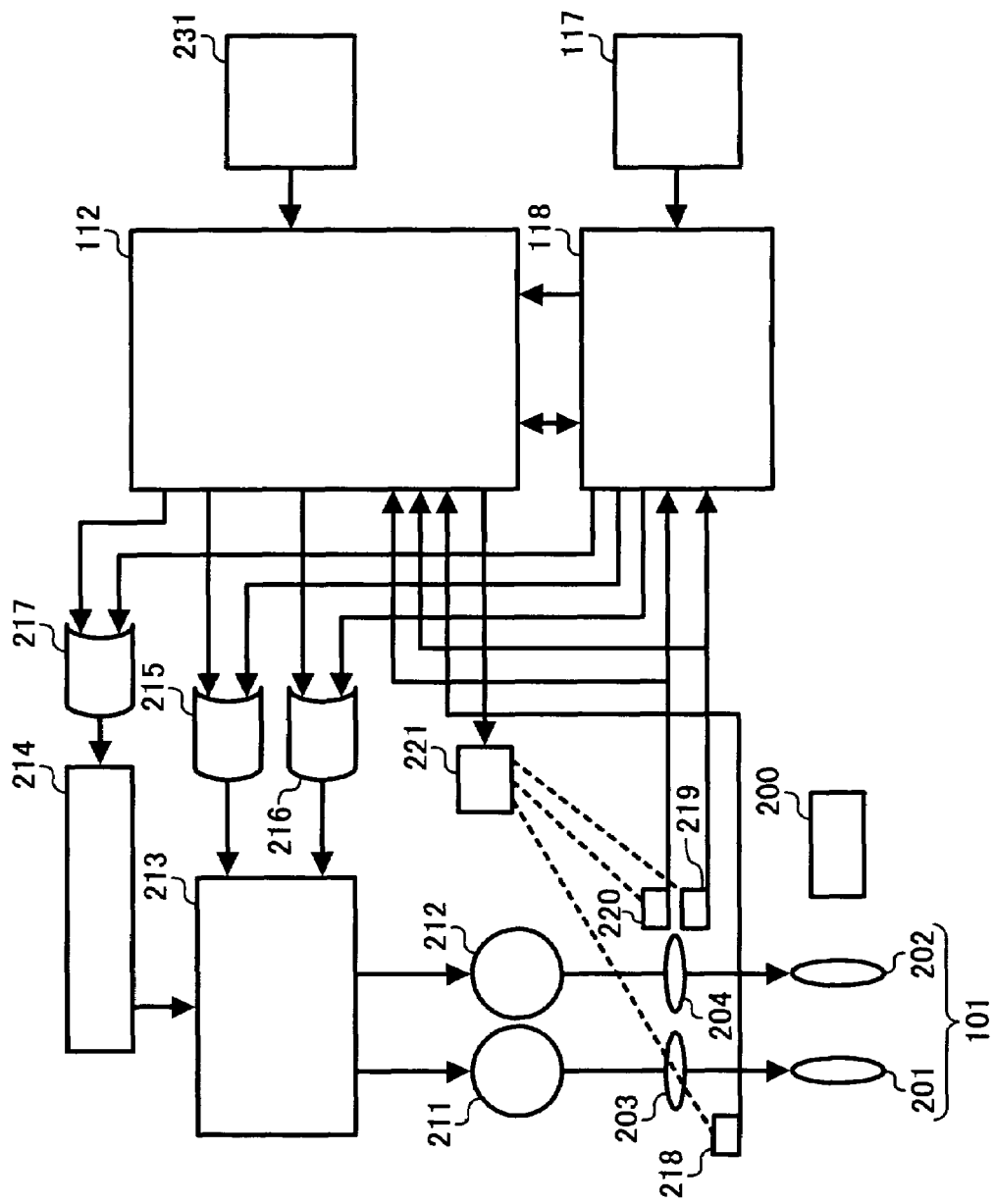
FIG. 2 is a block diagram illustrating the construction of a driver section 110 illustrated in FIG. 1.

A description of the construction of the driver section 110 with reference to FIG. 2 follows.

The driver section 110 comprises a focusing motor 211 for moving the focusing lens 201, a zoom motor 212 for moving the zoom lens 202, a motor driver section 213 for driving the respective motors 211, 212, a motor drive voltage control circuit 214 for controlling drive voltage applied to the respective motors 211, 212, OR circuits 215 to 217 connected to the main control section 112 and the sub-control section 118, a focusing position sensor 218 for detecting the position of the focusing lens 201, a zoom position sensor 219 for detecting the position of the zoom lens 202, an encoder 220 for outputting a pulse signal in response to the movement of the zoom lens 202, sensors 218, 219, and an electronic switch 221 for driving the encoder 220.

Output signals from the respective sensors 218, 219, and the encoder 220 are inputted respectively into the main control section 112 and the sub-control section 118. Hereby, the main control section 112 and the sub-control section 118 drive respectively the motors 211, 212 in response to a detection result indicated by the respective signal.

The OR circuits 215, 216 are connected to the motor driver section 213. The OR circuit 215 is used for positive rotation of the motors 211, 212, and the OR circuit 216 for reverse rotation of the motors 211, 212. The OR circuit 217 is connected to the motor drive voltage control circuit 214.

Hereby, the main control section 112 and the sub-control section 118 cooperate to achieve the positive and reverse rotations of the motors 211, 212. Herein, the main control section 112 is changeable in its drive voltage as described later.

An adjustment memory 231 is connected with the main control section 112. There are stored in the adjustment value memory 231 various data for driving the respective motors 211, 212 as a lens barrel control value described later, and data indicative of timing to drive the respective sensors 218, 219, and the encoder 220 through the electronic switch 221. The main control section 112 refers to data stored in the adjustment value memory 231 for highly accurate control. The respective sensors 218, 219 are of an optical sensor or photo-interrupter constructed with a light emitting device and an optical detection device for example. These sensors 218, 219 are adapted to detect the focusing lens 201 and the zoom lens 202, both existent at a predetermined position depending upon whether or not a member constructing the mechanical mechanisms 203, 204 (blade member attached to the motor) interrupts the light from the light emitting device.

These sensors 218, 219 output pulse signals of two kinds, one being a pulse signal having an edge generated when the zoom lens is located at a reference position, and the other being a pulse signal in response to the number of revolutions of the motor 62. It is possible to detect with the output signals of the two kinds at which pulse position the rotation position of the motor 62 is located from the reference position.

Although the pulse signals are herein inputted into both of the main control section 112 and the sub-control section 118, they may be inputted into one of them.

The zoom position sensor 219 is shielded from light provided that the lens barrel is accommodated, i.e., the lens barrel is in a position of a lens drawn in a camera body or is more further accommodated than in the previous case. The focus position sensor 218 is shielded from the light provided that the focusing lens 201 is further accommodated than in a position drawn a little from the state of the lens barrel settlement. Signal levels of the respective sensors 218, 219 are low upon the light being shielded, while being high upon the light being transmitted, a state where the light is not shielded.

The main control section 112 and the sub-control section 118 are both constructed with CPUs. FIG. 3 illustrates the kinds and constructions of programs executed by those CPUs. Hereinafter the CPU constituting the main control section 112 is referred to as a "main CPU", while the CPU constituting the sub-control section 118 as a "sub-CPU".

The main CPU executes, as illustrated in FIG. 3, a main task 302 for entire control, a photographing task 303 for photographing control, a regeneration task 304 for regeneration control for a photographed image, and a file task 305 for access control to a card memory depending upon a situation. The respective tasks 302 to 305 are application programs prepared on the manufacturing side. These programs are stored in a ROM constituting the main control section 112 for example.

An OS 301 controls a synchronization processing among various processing tasks in the main CPU, and exclusive control, etc. By executing the main task 302 there are realized a hardware initialization processing 310; an inter-CPU communication processing 312 for communication with the sub-CPU; a task starting processing 311 for starting and interruption of another task by receiving communication from the sub-CPU, a mode judge processing 313 for judging an operation mode switched by a user; and a switch or SW judge processing 314 for judging a switch, a state of which is changed, by analyzing the state of each switch of which the sub-control section 118 informs, and details of the state change of the switch. Hereby, overall sequence control is executed.

By executing the photographing task 303 there are realized a zoom processing 315 for driving the zoom lens 202; an AE/AF processing 316 for performing automatic exposure or AE/automatic focusing or AF; a still image recording processing 317 for recording a photographed still image; a card recording processing 318 for performing the recording in a memory card; and a photographing aperture/shutter processing 319 for performing an adjustment of the aperture and opening/closing of the shutter 102 upon photographing, etc.

For example, in the photographing mode, in the switch judgment processing, the main CPU once the photographing first release SW is turned on is detected, the AE/AF processing and the photographing drawing/shutter processing are required for the photographing task processing. The photographing task executes a processing responsible for that requirement.

By executing the regeneration task 304 there are realized a regeneration frame number determination processing 320 for enabling a user to select an image being an object of regeneration, and a still regeneration processing 321 for performing the regeneration, etc. By executing the file task 305 there are realized a system information initialization processing 322 associated with the storage of an image into the memory card or DOS information initialization processing, a system information updating processing 323, and a memory card access processing 324, etc. The main task 302 and the file task 305 are a fixed program.

The sub-CPU does not mount an OS unlike the main CPU. By executing the program stored in the sub-CPU there are realized, as illustrated in FIG. 3, a communication processing between CPUs 325 for executing communication with the main CPU, a main control power source processing 326 for controlling the supply of a current to the main control section 112, a switch or SW scanning processing 327 for scanning each switch constituting the switch section 117, and a lens barrel initialization I processing 328 for drawing out the lens barrel 200 in the settled state when the power source is turned on. The drawing-out of the lens barrel 200 is achieved by driving the zoom motor 212.

The main control section power source processing means a processing for turning the main CPU and the other peripheral devices on/off. Ordinarily, when the power source switch or main switch is set to be off, only the sub-CPU is in the operation state, and all other components are set off in their power source to bring the whole of the camera system to low consumption of the electric power. The sub-CPU turns on various power source circuits when the main switch is turned on. As the result of the switch scan processing, the main CPU is informed of the set states of the mode switches and various operation switches through the inter-CPUs communication.

The lens barrel 200 in the settled state is drawn out up to the photographing standby position define for standby of photographing. In the present embodiment, the sub-CPU draws out the lens barrel 200 by a predetermined distance, while the main CPU draws out the same up to the photographing standby position from the predetermined distance.

By drawing out the lens barrel by the predetermined distance, details of control executed by the sub-CPU for the drawing-out are simplified, and a memory capacity required for storage of a program executed by the sub-CPU is reduced. Since the drawing-out to the photographing standby position is carried out by the main CPU, the necessity to execute highly accurate position control is avoided.

Accordingly, the need of an expensive CPU having a high processing capability for the sub-CPU is eliminated. An inexpensive CPU including a mask ROM therein is useable for the sub-CPU. In contrast, by drawing out the lens barrel 200 with the aid of the sub-CPU the starting time till a useable state since the power source being turned on is shortened. It is therefore possible to manufacture the photographing apparatus 100 capable of being started in a short time while reducing the manufacturing cost.

When systems executed by the two control sections are developed respectively, it is desirable in view of debugging to concentrate on the development of one system. When the details of the control executed by the sub-CPU are simplified, the development of the system is facilitated, so that the development is concentrated on the system executed by the main CPU. This facilitates the system development for the whole of the photographing apparatus 100, and the manufacturing cost is reduced more.

When the power source is turned on, the lens barrel 200 is not necessarily settled. When the sub-control section 118 is set to be drawn out the lens barrel 200 in response to the state thereof, the details of the control are complicated. To avoid this, in the present embodiment, the lens barrel 200 is drawn out by the sub-control section 118 under the conditions that the lens barrel 200 is settled. Following this, the main control section 112 is set to be drawn out the lens barrel 200 in some situations, as illustrated in FIG. 4.

Figure 5:
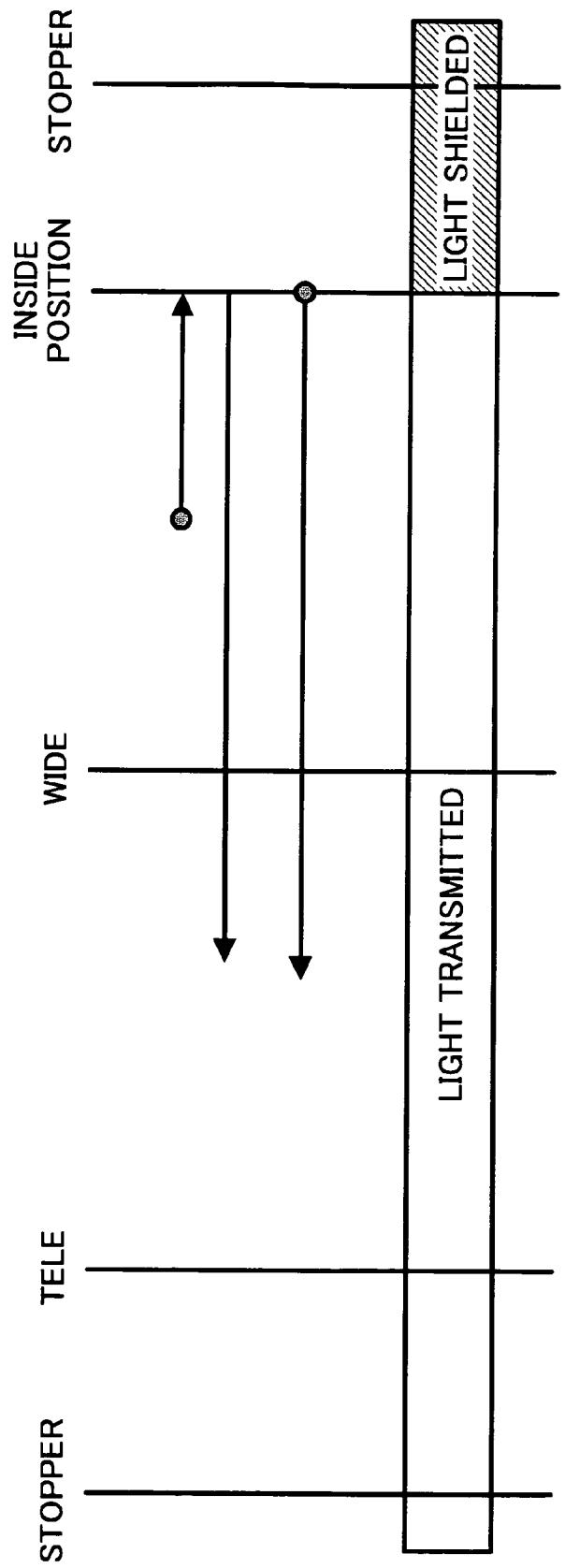
FIG. 5 is a view illustrating a detection method for a zoom lens by a zoom position sensor and illustrating a movement method for the zoom lens in response to the detection result.
Figure 6:
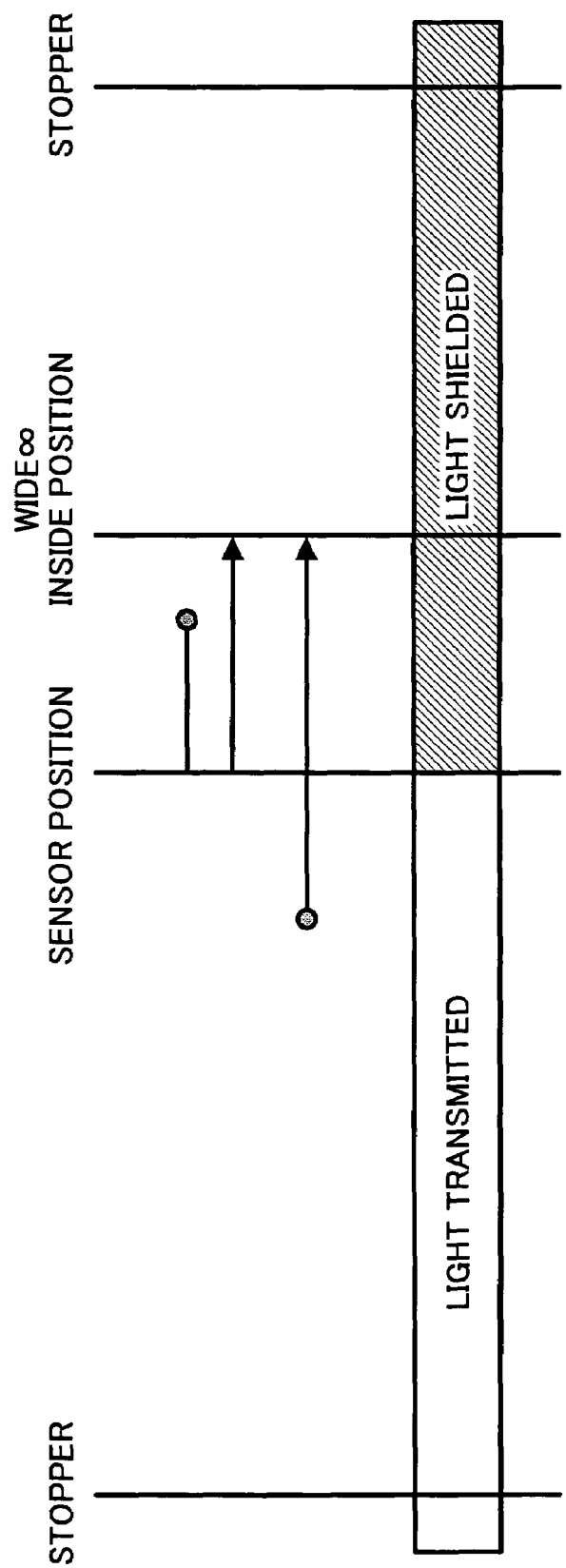
FIG. 6 is a view illustrating a detection method for a focusing lens by a focusing position sensor and illustrating a movement method for the focusing lens in response to the detection result.

In FIG. 4, "operation OK" indicated as the result of the sub-control section, means that the sub-control section 118 draws out the lens barrel 200. "Non-operation" means that the operation is not executed. "OFF" indicated in the column of "focus position sensor" means that a signal level of the focus position sensor 218 is low. "ON" means that the signal level is high. This holds also in the column of "zoom position sensor". In the row indicated by "Non-operation", the main control section 112 draws out the lens barrel 200 by a method in response to the result of detection or signal level) by the respective position sensors 218, 219. To be concrete, if those signal levels are both low or OFF, the lens barrel 200 is assumed to be settled (refer to FIGS. 5 and 6), and is drawn out.

When the signal levels of the respective position sensors 218, 219 are both high or ON, the following are performed in the order illustrated in FIG. 4: a movement of the focusing lens 201 to a position at which the focusing lens 201 should be existent when the lens barrel 200 is in the state of settlement; a movement of the zoom lens 202 to a position at which the focusing lens 201 should be existent when the lens barrel 200 is in the state of settlement; a movement of the zoom lens 202 to a photographing standby position; and a movement of the focusing lens 201 to the photographing standby position.

When the zoom position sensor 219 is "OFF", and the focusing position sensor 218 is "ON", the following are performed in the order illustrated in FIG. 4: a movement of the focusing lens 201 to a position at which the focusing lens should be existent when the lens barrel 200 of the focusing lens 201 is in the state of the settlement; a movement of the zoom lens 202 to the photographing standby position; and a movement of the focusing lens 201 to the photographing standby position.

When the zoom position sensor 219 is "ON", and the focusing position sensor 218 is "OFF", the following are performed in the order illustrated in FIG. 4: a movement of the zoom lens 202 to a position at which the zoom lens 202 should be existent when the lens barrel 200 is in the state of the settlement of the zoom lens; a movement of the zoom lens 202 to the photographing standby position; and a movement of the focusing lens 201 to the photographing standby position. Lines with arrows in FIGS. 5 and 6 indicate a moving method for the zoom lens 202 and the focusing lens 201 for each result of the detections by the sensors 219, 218.

A symbol "-" is provided in each column of the zoom position sensor 219 and the focusing position sensor 218 in the row indicated by Operation OK. This indicates that the details of the operation are not changed with signal levels of the zoom position sensor 219 and the focusing position sensor 218. Accordingly, the main control section 112 draws out the lens barrel 200 irrespective of the signal levels of the zoom position sensor 219 and the focusing position sensor 218 after the sub-control section 118 draws out the lens barrel 200.

In the present embodiment, as described above, the main control section 112 executes the movements of the zoom lens 202 and the focusing lens 201 in response to the respective positions thereof without complicated control by the sub-control section 118. Thus, the details of the complicated control executed by the sub-control section 118 are avoided, and interference between the lenses 201, 202 is avoided, and their movements are realized.

Figure 7:
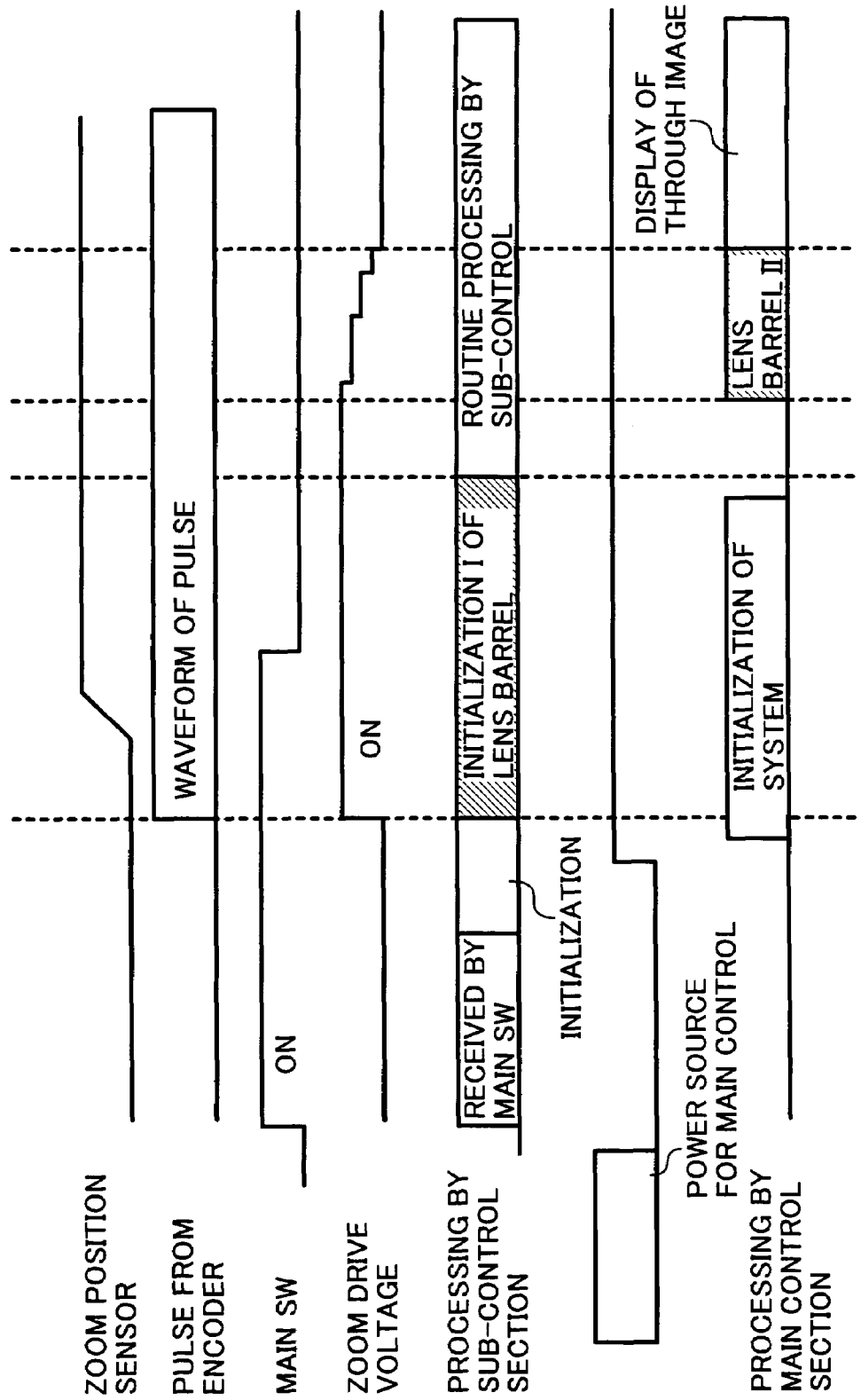

Referring to FIG. 7, there is provided a timing chart illustrating the operation of each section of the photographing apparatus 100 when the power source is on.

When the main switch is turned on by the operation of a user, the sub-control section 118 receives the operation, and executes the initialization processing. With the execution of the initialization processing, power supply to the main control section 112 is started. The sub-control section 118 executes the lens barrel initialization I processing for successively draws out the lens barrel. With the execution of the lens barrel initialization I processing, the zoom motor 212 is driven, the encoder 220 outputs a pulse signal, and the signal level of the zoom position sensor 219 changes from low to high. The sub-control section 118 advances to a routine processing after the execution. In the routine processing the switch section 117 is scanned, and communication with the main CPU of the main control section 112 is executed.

The main control section 112, once the power supply is started, first executes the system initialization processing. Subsequently, the main control section 112, after the execution of the lens barrel initialization I processing by the sub-control section is finished, executes a processing (indicated as "lens barrel II" in the figure) for further drawing out the lens barrel 200 drawn out by the sub-control section 118. The main control section 112, after the execution, carries out through image display that an image converted into an electric signal or video signal by the CCD 103 is displayed on the display section 106.

As described above, the main control section 112, after the drawing-out of the lens barrel 200 drawn out by the sub-control section 118 is interrupted, draws out the lens barrel 200.

It is therefore avoided that the main control section 112 cannot recognize but the sub-control section 118 draws out the lens barrel 200, and the main control section 112 can deal with accidental drawing-out owing to inertia caused by the drawing-out by the sub-control section. The lens barrel 200 can thus be drawn out with high accuracy.

In the following, there will be described the drawing-out of the lens barrel 200 by the sub-control section 118 and the main control section 112 with reference to FIGS. 2 and 8.

The main control section 112 sends a control signal to the motor driven voltage control circuit 214 through the OR circuit 217 while executing the system initialization to set the drive voltage level to "Level-0". The voltage level indicates a maximum revolution level of the zoom motor 212. The main control section 112 outputs a control signal to the electronic switch 221 to drive the respective sensors 218, 219, and the encoder 220 in their state before the sub-control section 118 outputs a zoom drive signal.

The sub-control section 118 outputs a zoom drive signal as a control signal to the motor driver section 213 through the OR circuit 215 within a set time interval of the "Level-0". Hereby, the zoom motor 212 is driven.

The sub-control section 118 counts a number (e.g. the number of edges of the pulse) of a pulse signal outputted from the encoder 220 while the drive signal is outputted. The sub-control section 118, once the number of counts reaches a predetermined value Ps1, interrupts the outputting of the drive signal. The zoom motor 212 rotates with an inertia thereafter, and the sub-control section 118 informs the main control section 112 of the actually counted number of edges Psx. The main control section 112 starts the drive of the zoom motor 212.

Figure 8:
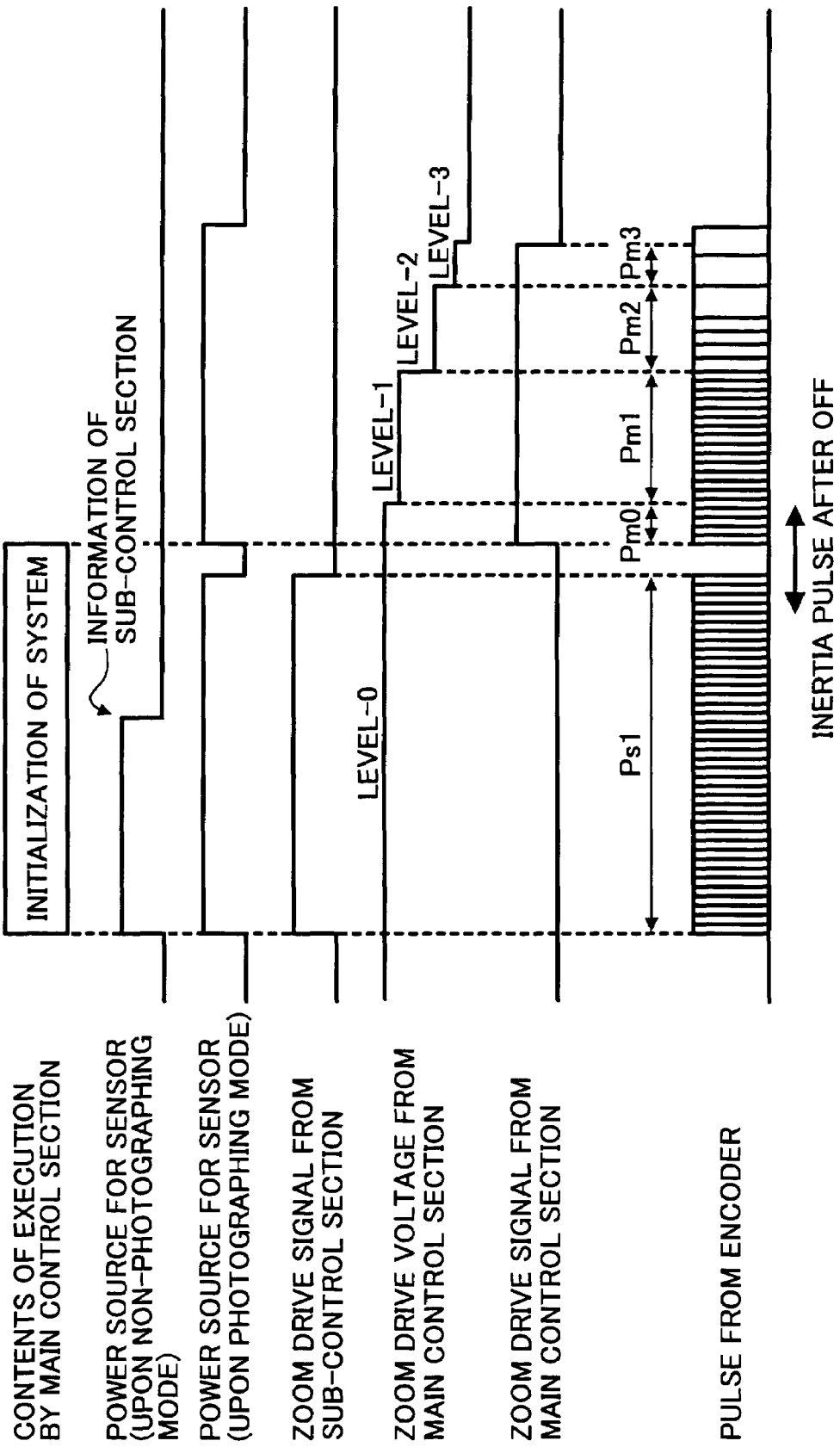
FIG. 8 is a timing chart illustrating the method for drawing out the lens barrel by the sub-control section and the main control section.

The main control section 112 lowers the level of the drive voltage as illustrated in FIG. 8 from "Level-0" to "Level-1", from "Level-1" to "Level-2", and from "Level-2" to "Level-3" stepwise. The revolutions of the zoom motor 212 are lowered. Hereby, the zoom lens 202 is interrupted with high accuracy at a position to be interrupted. The zoom lens 202 may be braked during a time interval the "Level-3" is set or during a predetermined time thereafter.

For the number of edges of the signal outputted from the encoder 220 a number to be counted is previously determined for each level such that the zoom lens 202 is interrupted at the photographing standby position. "Pm1", "Pm2", "Pm3" in the figure are a symbol indicative of its number, respectively. These numbers are stored in the adjustment value memory 231 for example as controlling data.

When the total number of the edges from the position of a lens drawn in a camera body (hereinafter, referred to as an inside position) to the photographing standby position is assumed P, the predetermined value Ps1 is defined to be Ps1<P−Pm1-Pm2-Pm3. In the "Level-0 the number Pm0 to be counted by the main control section 112 is Pm0=P-Psx-Pm1-Pm2-Pm3.

The sub-control section 118, after the counts of the number of edges becomes Ps1, monitors a change in the signal level outputted from the encoder 220. The sub-control section 118, once confirming that the change does not occur for a predetermined time, informs the main control section 112 of the number Psx of edges counted until the interruption, as the zoom lens 202 being interrupted.

The main control section 112, after receiving the informing, starts the drive of the zoom motor 212.

In the present embodiment, as described above, after the sub-control section 118 judges the drawn-out zoom lens 202 is interrupted, it forces the main control section 112 to draw out the zoom lens 202. Therefore, the interruption position of the zoom lens 202 by the sub-control section 118 is accurately grasped, and the zoom lens 202 can be moved by the main control section 112, so that the zoom lens 202 can be interrupted highly accurately at the photographing standby position. The monitoring of the output signal from the encoder 220 after the sub-control section 118 counts up to the number of edges Ps1 may be done by the main control section 112.

The operation of the main control section 112 and the sub-control section 118 will be described in detail with reference to flowcharts illustrated in FIGS. 9 to 15.

These flowcharts are realized by carrying out the program illustrated in FIG. 3 by means of the sub-control section or sub-CPU 118 and the main control section or main CPU 112.

Figure 9:
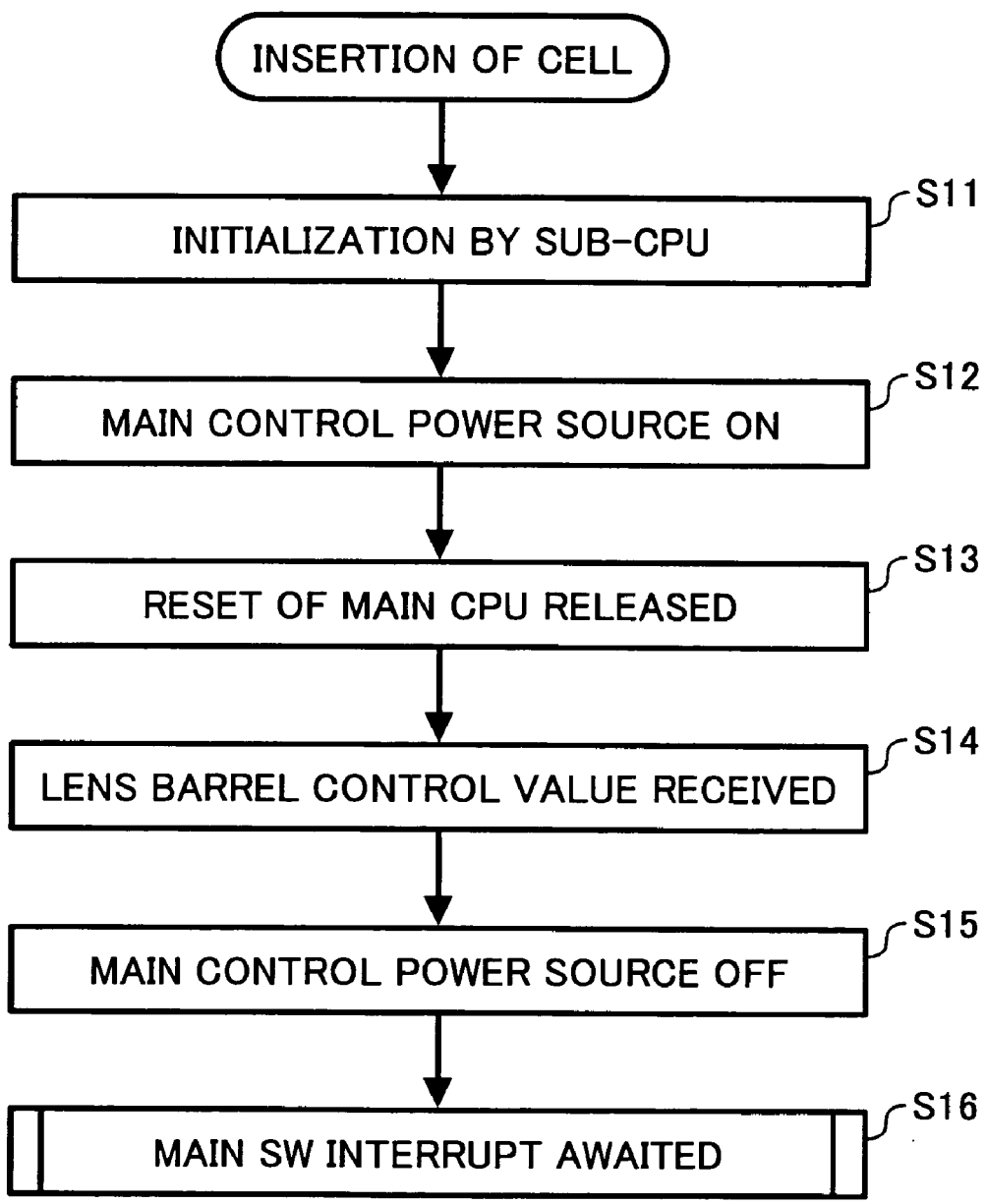
FIG. 9 is a flow chart illustrating a flow of a processing executed by the sub-control section, when a cell being a power source is inserted anew.
Figure 10:
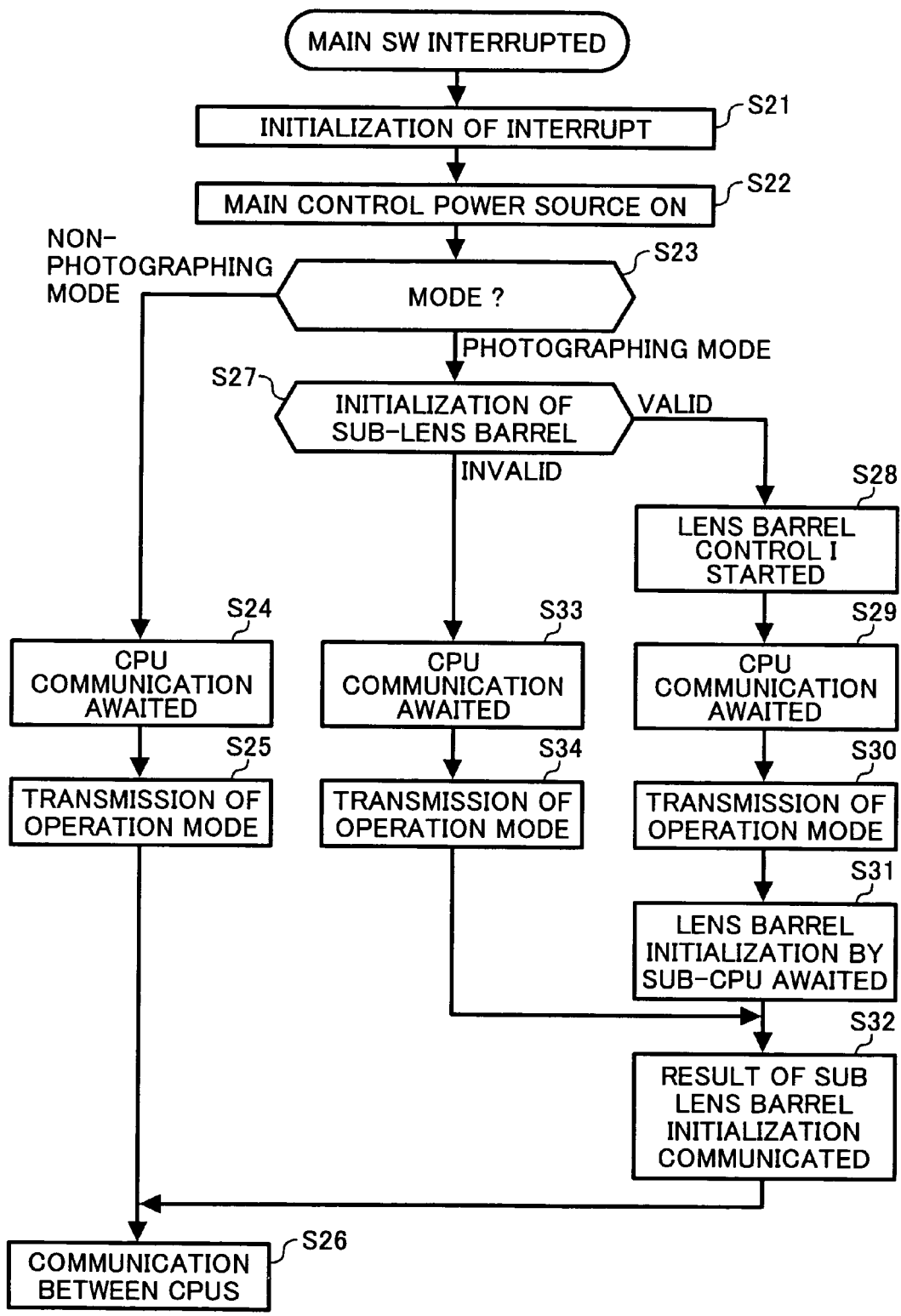
FIG. 10 is a flow chart illustrating a flow of a processing which is executed by the sub-control section following to the generation of an interrupt signal through the operation of the main switch.
Figure 11:
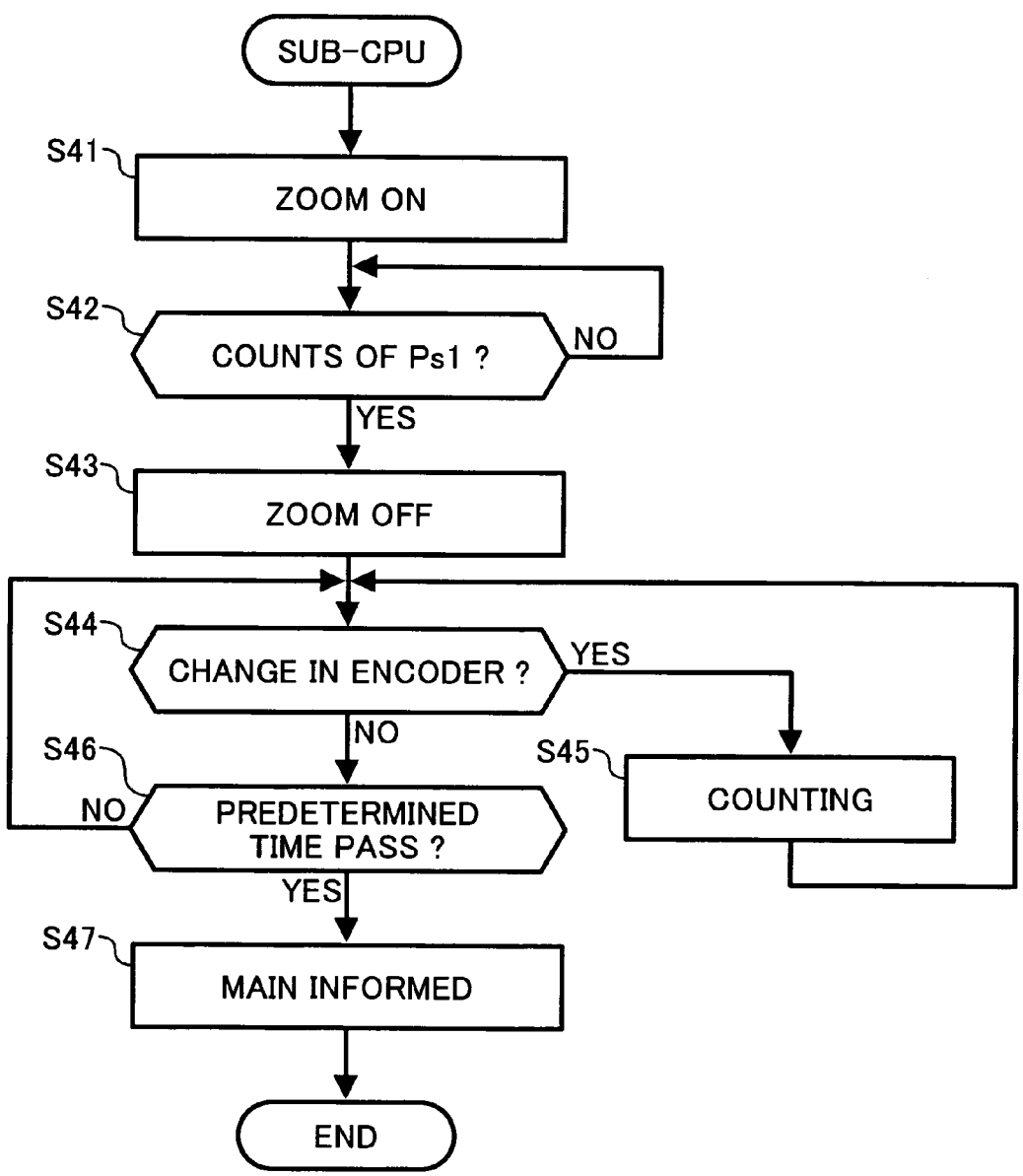
FIG. 11 is a flow chart illustrating a flow of a processing executed by the sub-control section to draw out the lens barrel.

FIGS. 9 to 11 show flowcharts executed by the sub-control section 118.

FIG. 9 illustrates a flow of a processing executed by the sub-control section 118 when a cell as the power source section 116 is inserted into a camera anew.

The sub-control section 118 first executes the initialization processing in step S11 likewise when an operation to the main switch is received. Then, in step S12, the main control power source is turned on through the supply of a current to the main control section 112. Successively, in step S13, reset for the main control section 112 or main CPU is released. Hereby the main CPU is started. Thereafter, the control proceeds to step S14.

The sub-control section 118 receives a lens barrel control value indicative of the position of the lens barrel 200 from the main control section 112 through communication between the CPUs in step S14. The lens barrel control value is a control amount including an effective flag indicative of whether or not the zoom initialization is executed, and an initialization drive amount, and herein the number of edges of a signal outputted from the encoder 220 is received. Then, in step S15, the supply of a current to the main control section 112 is interrupted, and the power source is turned off. Thereafter, the control proceeds to step S15 to enter a standby state where generation of an interrupt signal by the operation of the main switch is awaited. Reception of the operation of the main switch is achieved by the generation of the interrupt signal.

Referring to FIG. 10, there is illustrated a flow of a processing executed by the generation of the interrupt signal.

The sub-control section 118, once there is an interruption of the main switch, first executes the initialization processing in step S21 (refer to FIG. 7). Successively, in step S22, the supply of the current to the main control section 112 is started. Hereby, the main control power source is turned on, and the reset of the main CPU is released. Thereafter, the sub-control section 118 proceeds to step S23, and judges the kind of an operation mode designated by the position of the mode changeover switch. More specifically, it is judged whether the present operation mode is the photographing mode or the non-photographing mode. When the operation mode is the photographing mode, the control proceeds to step S27. When the operation mode is the non-photographing mode such as the regeneration mode, the control proceeds to step S24.

The sub-control section 118 in step S24 waits until the communication between the main control section 112 and the main CPU can be carried out. The sub-CPU subjects a communication interruption to the main CPU. Then, the sub-control section 118, in step S25, informs the main CPU of the designated operation mode through communication. Thereafter, the control proceeds to step S26 for communication with the main CPU. The processing in step S26 is executed as one of the routine processing in FIG. 7.

The sub-control section 118, upon the photographing mode in step S27, incorporates output signals from the respective sensors 218, 219, and judges from signal levels thereof whether or not the sub-control section 118 effectively executes the drawing-out for the initialization of the lens barrel 200. More specifically, it verifies whether the sub-lens barrel initialization is valid or invalid. When one-way drive from the accommodation state to the photographing standby state can be executed as the first lens barrel initialization processing in the sub-CPU, and the lens barrel is not existent at a predetermined position upon the main SW being on, the sub-CPU side does not execute the first lens barrel initialization processing, so that information that the lens barrel is not existent at the predetermined position may be simply sent to the main CPU.

When the signal levels of the respective sensors 218, 219 are both not low, the control proceeds to step S33. In other cases, the control proceeds to step S28.

In step S28, the zoom drive signal is outputted to start a control where the zoom motor 212 is driven until counts of the number of edges of the output signal from the encoder 220 become the value Ps1 (refer to FIG. 8).

Subsequently, in step S29 the sub-CPU of the sub-control section 118 awaits the communication with the main CPU of the main control section 112 until it is enabled, and proceeds to step S30 after the communication is enabled. The sub-control section 118, in step S30, informs the main CPU of an operation mode designated by the position of the mode changeover switch through communication. Thereafter, the control proceeds to step S31.

The sub-control section 118, in step S31, waits until the counts of the number of edges of the output signal of the encoder 220 become "Ps1". Once the counts become "Ps1", the control proceeds to step S32, and the outputting of the zoom drive signal is interrupted.

It informs the main CPU of the counts Psx of the number of edges counted just before it communicates with the main CPU. More specifically, the sub-CPU informs the sub-control section of a discrimination whether or not the lens barrel initialization processing is executed, a discrimination whether the initialization is OK or NG, and the counts Psx (counts from a reference position) as interruption position information of the lens barrel. Thereafter, the control proceeds to step S26, and there is attained an inter-CPU communication environment where a result of scanning of the switch state of the switch section 117 is transmitted to the main CPU.

The sub-CPU of the sub-control section 118 waits, upon the lens barrel initialization being invalid, in step S33, until communication with the main CPU of the main control section 112 is enabled, and once the state is attained, the control proceeds to step S34. The sub-control section 118, in step S34, informs the main CPU of the operation mode designated by the position of the mode changeover switch through communication. Thereafter, the control proceeds to step S32, and informs the main CPU of that the lens barrel 200 is not drawn out.

Referring to FIG. 1, there is illustrated a flow of a processing of execution of drawing out the lens barrel 200. The figure illustrates in more detail processing performed during the execution of processing of steps S28 to S32, taking into consideration the drawing-out of the lens barrel.

The sub-control section 118, in step S41, first outputs the zoom drive signal. Then, in step S42, it awaits until the counts of the number of edges of the output signal of the encoder 220 become "Ps1". Once the counts become "Ps1", the control proceeds to step S43 to interrupt the output the zoom drive signal. Thereafter, the control proceeds to step S44.

The sub-control section 118, in step S44, judges whether or not there is a change in the output of the encoder 220. When the level of the signal changes from low to high, "YES" is judged and the control proceeds to step S45, where after the counts are incremented, the processing in step S44 is again executed. Hereby, drawing-out by the rotation inertia of the zoom motor 212 is counted.

In step S44, when the signal level keeps low, "NO" is judged, and the control proceeds to step S46.

The sub-control section 118 judges whether or not a predetermined time has passed since the output signal level of the encoder 220 is judged not changed. It judges NO until the predetermined time is passed, and returns to step S44, where it awaits until the signal is not changed.

When a change in the output signal level is not generated for a predetermined time, YES is judged and the control proceeds to step S47, where after it informs the main CPU of the counts Psx, a series of the processing are completed.

In the following, the operation of the main control section 112 will be described below in detail.

Figure 12:
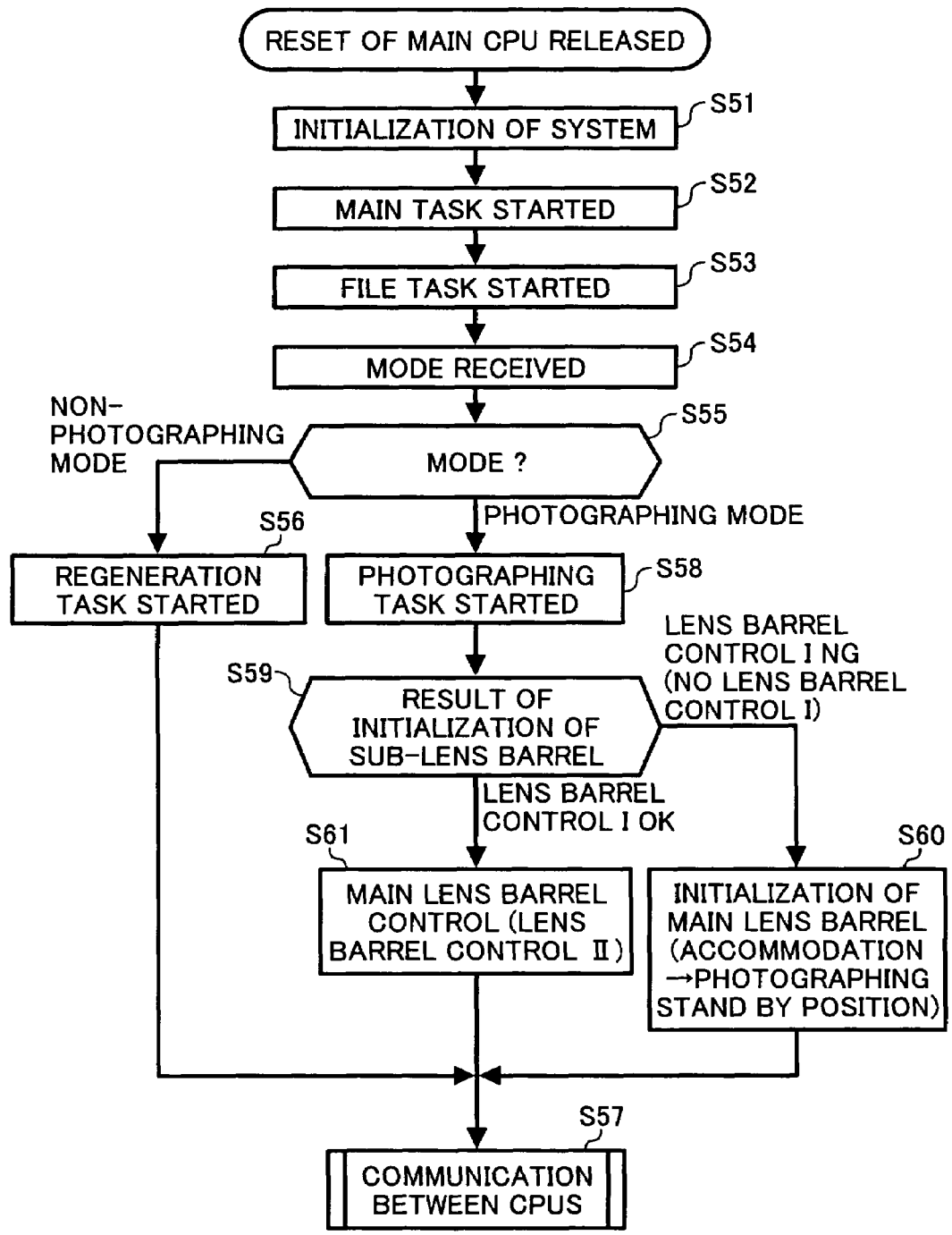
FIG. 12 is a flow chart illustrating a flow of a processing executed by the main control section by permitting the sub-control section to execute the processing in step S13 illustrated in FIG. 9.
Figure 13:
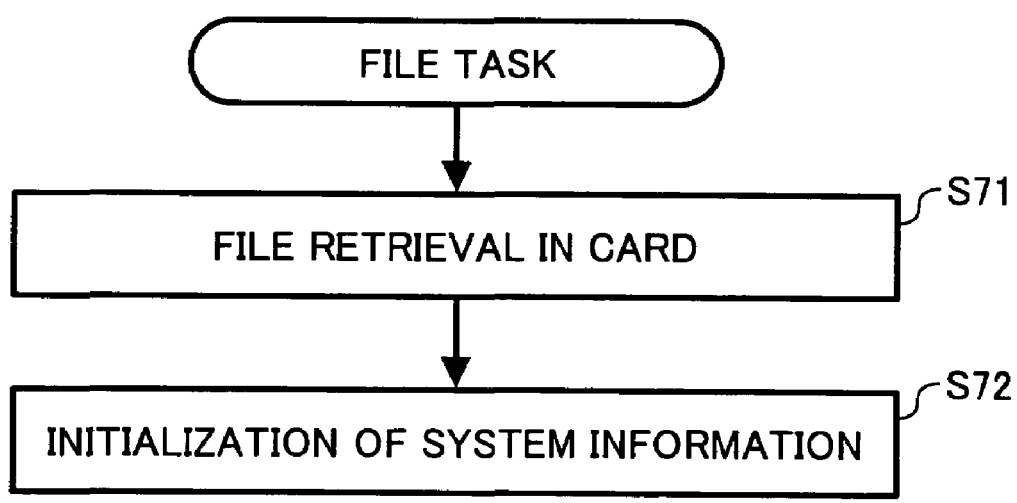
FIG. 13 is a flow chart illustrating a flow of a processing executed by a file task upon starting.

Referring to FIG. 12, there is illustrated a flow of the processing executed by the main control section 112 when the processing in step S13 in FIG. 9 is executed by the sub-control section 118.

The main control section 112 once receiving a reset release from the sub-CPU, first executes in step S51, a system initialization processing starting of OS 301 and various initializations by the OS 301. Hereby, initialization for peripheral devices and the like are executed. Although in the system initialization processing additionally to the initialization of CPU or hardware itself, a processing for transferring the program itself from an external ROM to a RAM is involved if circumstances require, a processing for monitoring the lens barrel position information is not involved. Next, in step S52, a main task 302 is started. Then, in step S53, file task 304 is started irrespective of photographing or non-photographing. Then, the control proceeds to step S54.

The file task 304, once started, retrieves files in a memory card in step S71. In succession, in step S72, system information is initialized following the result of the retrieval. Thereafter, the control proceeds to a state where a processing in response to a request from another task is executed.

The main control section 112, in step S54, receives data indicative of an operation mode instructed by the mode changeover switch from the sub-control section 118. More specifically, the main CPU receives indication from the sub-CPU whether the operation mode is the photographing mode or the non-photographing mode. Then, in step S55, the kind of the operation mode is judged. When the operation mode is the photographing mode, the control proceeds to step S58. When the operation mode is the non-photographing mode, the control proceeds to step S56.

In step S56, the regeneration task 303 is started. In step S57, the main control section 112 then executes a communication processing for receiving required data from the sub-control section 118.

The main control section 112, when the photographing mode is instructed in step S58, starts the photographing task 302. Then, the main control section 112, in step S59, waits until an initialization result of the lens barrel 200 is received from the sub-control section 118, and judges a received result.

The main control section 112, in step S59, proceeds to step S60 when the sub-control section 118 executes the initialization I processing of the lens barrel 200. After an initialization processing (refer to FIG. 4) is executed, where the lens barrel 200 is drawn out in response to signal levels of the respective sensors 218, 219, the main control section 112 transfers to step S57.

When the sub-control section 118 does not execute the initialization I processing of the lens barrel 200, the main control section 112 transfers to step S61. The main control section 112, after the initialization processing is executed such that the lens barrel 200 drawn out by the sub-control section 118 is further drawn out, transfers to step S57.

Figure 14:
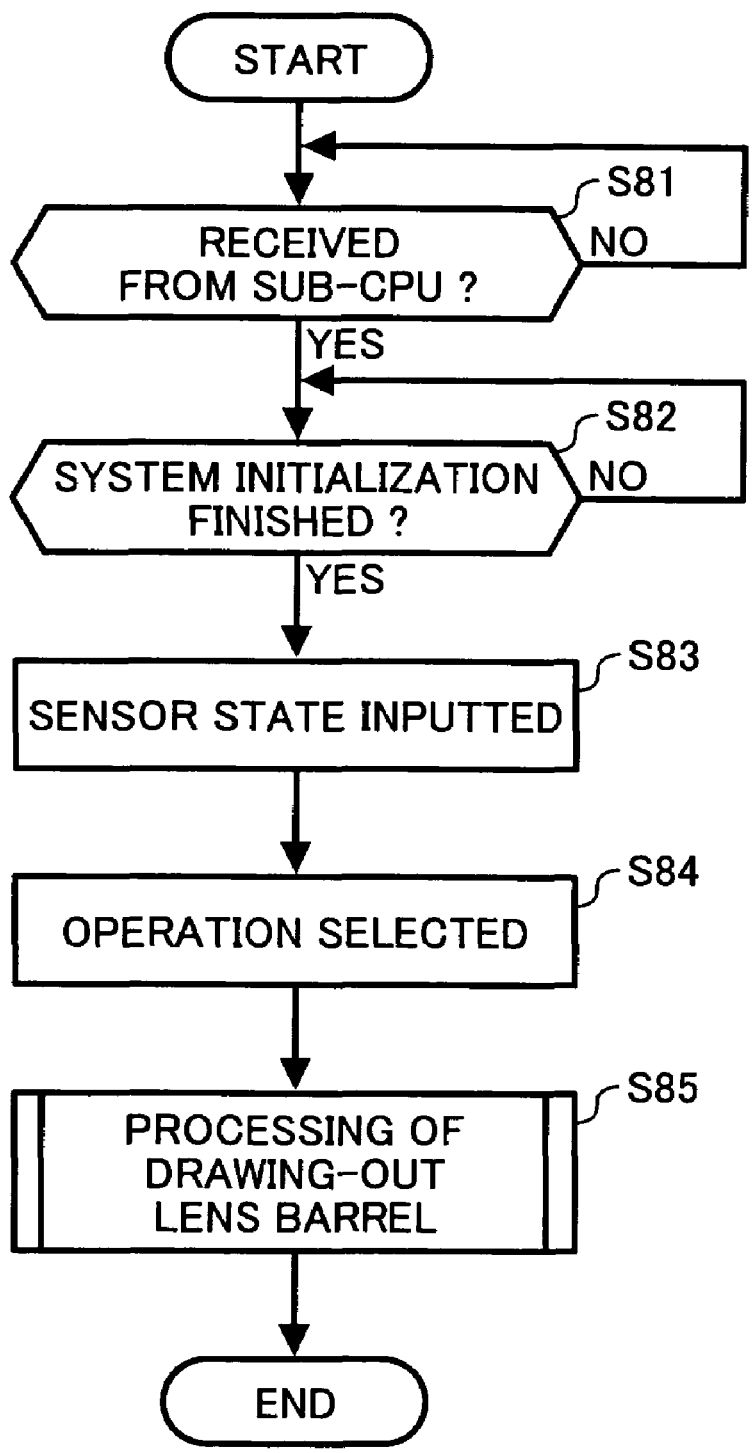
FIG. 14 is a flow chart of a lens barrel initialization processing by the main control section.

Referring to FIG. 14, there is illustrated a flow chart of the lens barrel initialization processing by the main control section 112. A processing executed for drawing out the lens barrel 200 is selected and illustrated in the form of a flow.

The main CPU of the main control section 112, in step S81, first waits until the initialization result of the lens barrel 200 from the sub-CPU of the sub-control section 118 is received. Then, in step S82, it waits until the execution of the system initialization processing is finished. In succession, in step S83, signal levels of the respective sensors 218, 219 are inputted.

The main control section 112, in step S84, selects an operation (refer to FIG. 4) to be executed, to draw out the lens barrel 200, from the initialization result received from the sub-CPU and from the signal levels of the respective sensors 218, 219. Then, in step S85, there is executed a lens barrel drawing-out processing, where the lens barrel 200 is drawn out following the selected operation. By executing this there is finished the execution of the processing for drawing out the lens barrel 200 following the power source being turned on.

Figure 15:
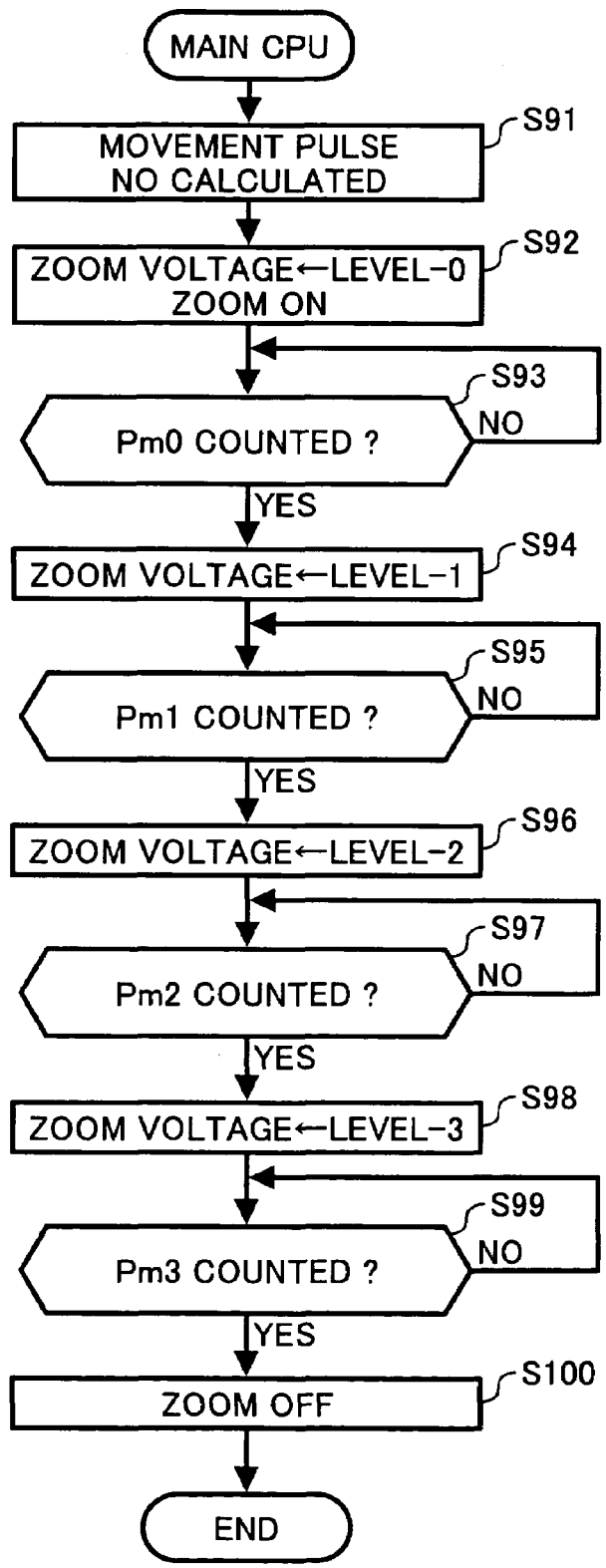
FIG. 15 is a flow chart illustrating a flow of a processing executed by the main control section to draw out the lens barrel when the sub-control section draws out the lens barrel.

When the main control section 112, in step S84, selects the operation where the lens barrel 200 drawn out by the sub-control section 118 is further drawn out, in step S85, a drawing-out processing illustrated by a flow chart in FIG. 15 is executed. In the following, the processing will be described in detail with reference to FIG. 15.

The main control section 112, in step S91, first calculates, using a count value Psx received as the result of the initialization from the sub-control section 118, a value Pm0 obtained by counting the number of edges of an output signal of the encoder 220 when the level of the zoom drive voltage is "Level-0".

Then, the main control section 112, in step S92, outputs the zoom drive signal to the OR circuit 215. Thereafter, the control proceeds to step S93, and waits until the counts become "Pm0".

The main control section 112, once the counts reach "Pm0", proceeds to step S94 to alter the level of the zoom drive voltage to "Level-1". After the alteration, the control proceeds to step S95.

The main control section 112 waits, after the alteration, until the counts of the counted output signal of the encoder 200 become "Pm1". Thereafter, in step S96 to S99, it alters the level of the zoom drive voltage and alters the counts, and executes the similar processing (refer to FIG. 8.).

The main control section changes the signal level of the zoom drive voltage to "Level-3". In step S99 after it is judged that the counts counted after changing are "Pm3", this step proceeds to step S100. The main control section 112 interrupts the outputting of the zoom drive signal, and sets the level of the zoom drive voltage to 0. Thereafter, a series of processing are finished.

Although, in the present embodiment, the zoom position sensor 219 and the encoder 220 have been used for the position detection of the zoom lens 202, the present invention is not limited thereto.

Modified Embodiment

Figure 16:
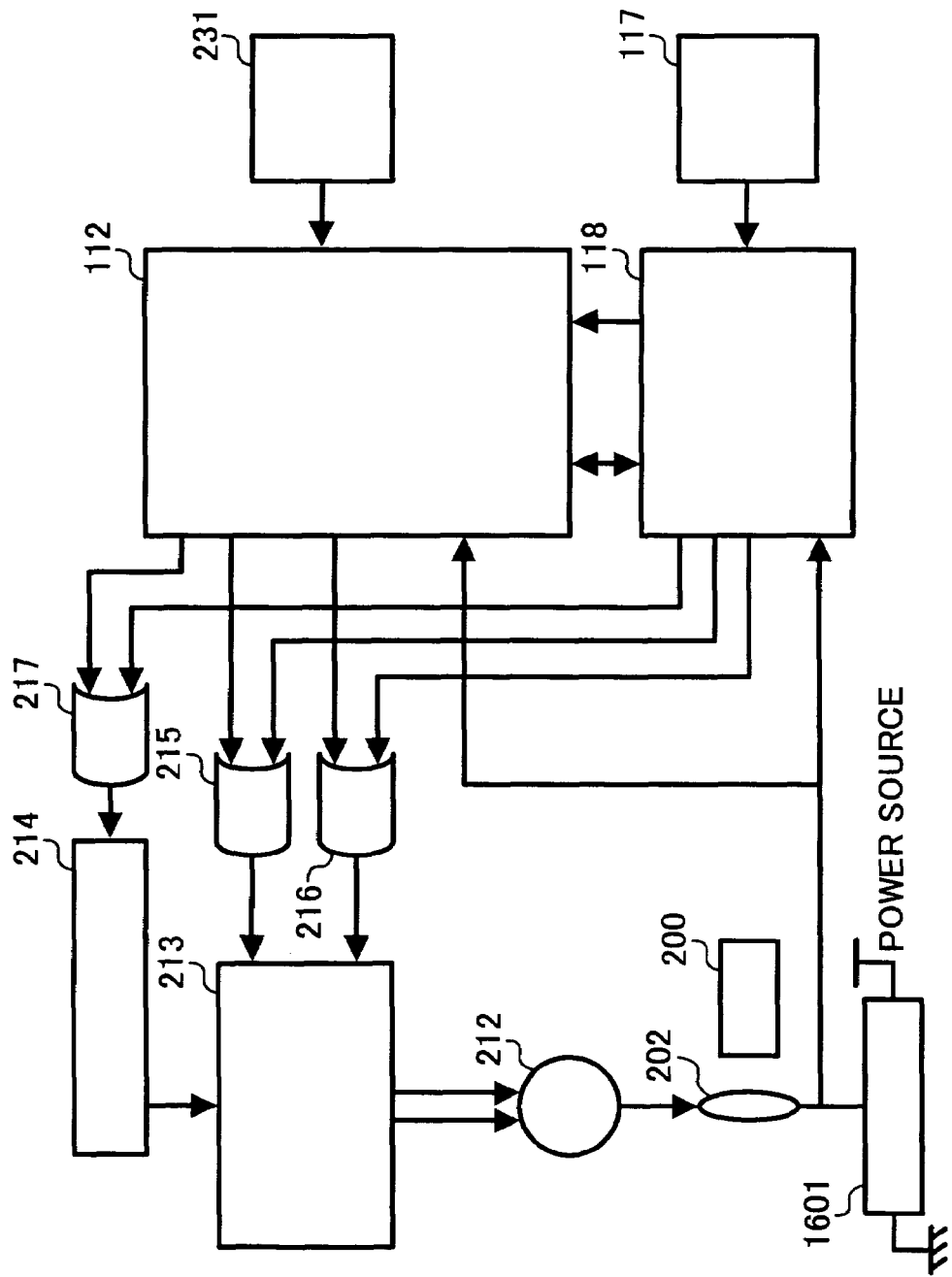
FIG. 16 is a view illustrating a modified example of the driver section to detect the position of the zoom lens and the movement of the same.

There may be adopted for example a modified construction wherein as illustrated in FIG. 16 voltage is applied to opposite ends of a resistance plate 1601, and the position of a tap sliding on the resistance plate 1691 is moved in response to the position of the zoom lens 202. In the construction illustrated in FIG. 16, both of the position of the zoom lens 202 and the movement thereof can be detected on the basis of the voltage value of the tap.

Figure 17:
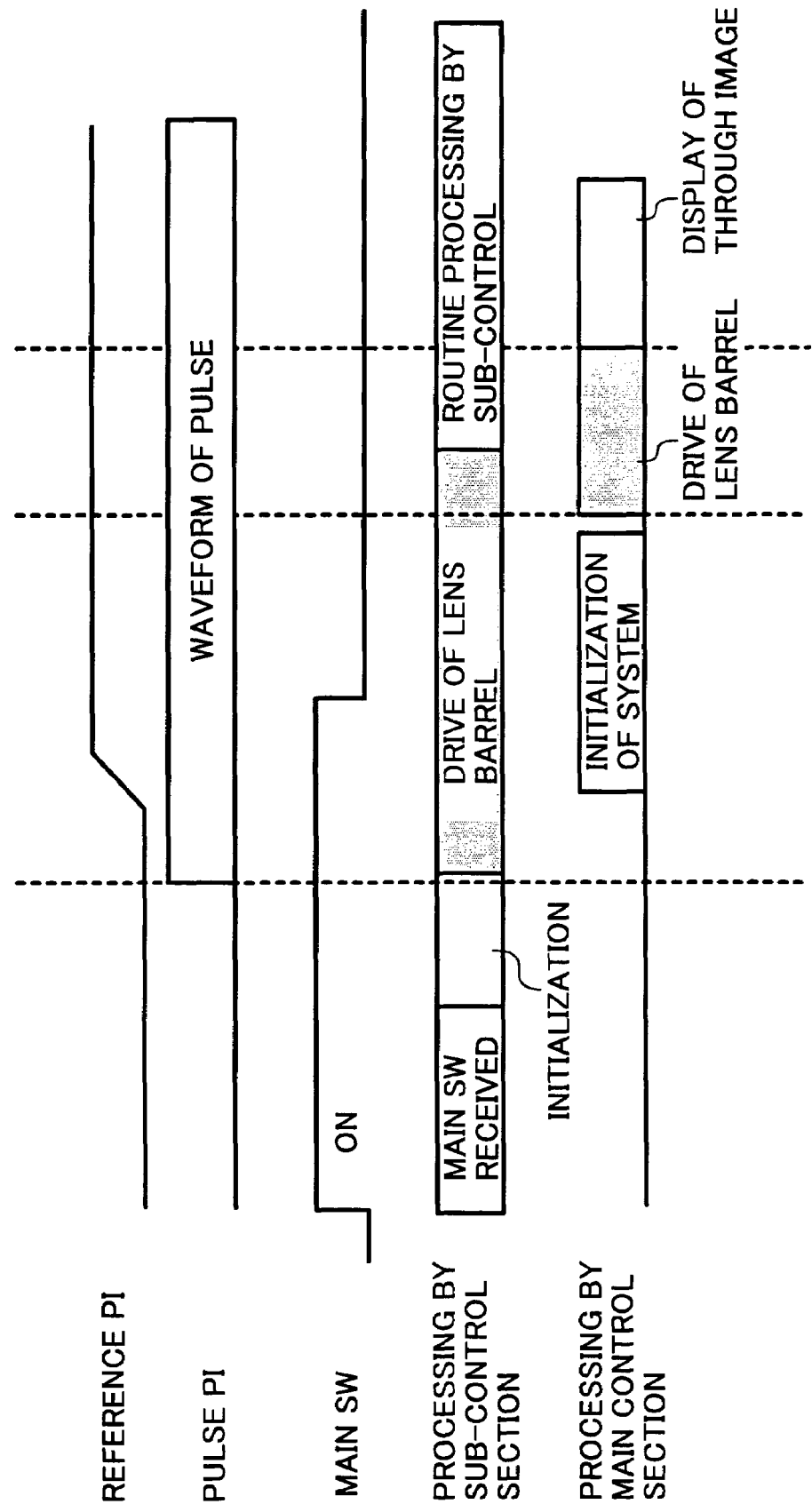
FIG. 17 is a timing chart illustrating the modified example illustrated in FIG. 16.

In the construction described above, as illustrated in a timing chart in FIG. 17, the lens position of the lens barrel is detected on the side of the main control section 112 in the course of the execution of the first lens barrel initialization processing, and the first lens barrel initialization processing and the second lens barrel initialization processing can be executed in parallel, so that the time required for the lens barrel initialization can be further shortened.

Although the lens barrel initialization processing is adapted to be parallel to the system initialization processing of the main CPU, when a further improvement is desired, starting of the execution of the first lens barrel initialization processing is promoted to the utmost. Accordingly, in this situation, the main CPU may be adapted such that after SW information of the SW section 117 is inputted on the basis of the main SW being on, the main CPU first judges whether the mode is the photographing mode or the non-photographing mode, and then transmits an execution instrument of the first lens barrel initialization processing to the sub-CPU, and thereafter it executes the system initialization.

Herein, for starting the execution of the first lens barrel initialization processing earlier, in the sub-control section 118, the SW state of the SW section 117 may be verified just after the main SW is set on, and it may be judged without awaiting the starting of the main CPU or main control section whether the mode is the photographing mode or the non-photographing mode, and as the result the starting of the first lens barrel initialization processing may be started.

However, in contrast, an inexpensive sub-CPU is usually made a mask ROM, so that if it has a function of judging the SW state of the SW section 117 only with the single sub-CPU, then it loses general purpose property, causing it to be useable only with that camera. Further, a control parameter required for the execution of the first lens barrel initialization processing cannot be updated, so that if there is a bug in the control parameter, then the ROM is not useable and is abandoned.

On the sub-CPU side, it is possible to adopt means wherein the control parameter required for the execution of the first lens barrel initialization processing is previously received through the main CPU, and until a cell of the power source is pulled out, the control parameter is held in a memory on the sub-CPU side. Concrete details of the control parameter are a flag whether the first lens barrel initialization processing is made valid or invalid, and a control quantity or a drive quantity of the first lens barrel initialization processing, and further information of the mode SW or pattern information for judging whether the operation mode is the foregoing photographing mode or the non-photographing mode. With this construction it is possible to improve the general purpose property of the sub-CPU itself.

But, when the sub-CPU is limited to simple execution of the first lens barrel initialization processing (more specifically, when a full power lens barrel initialization processing is executed), the means may be sometimes prohibited. For example, when the main CPU detects during photographing that the life of the cell is final, the control parameter for example, a valid flag required for the first lens barrel initialization processing, held on the side of the sub-CPU is cleared and made invalid. Hereby, when the main SW is turned on next time, the full power lens barrel initialization processing by the sub-CPU is not started, and it is possible to drive the lens barrel till the photographing standby state although it is low starting, by making use of the motor drive voltage control circuit 214 from the main CPU.

It is herein noticed that a program for executing the processing shown in the flow chart belongs to the scope of the present invention, and the program may be stored and delivered in a recording medium readable by a computer such as a semiconductor memory, a CD-ROM, and a magnetic tape. A computer including in the scope at least a microcomputer, a personal computer, and a general-purposed computer may be adapted to read and execute the program from the recording medium.

In the embodiment 1 of the present invention, when the power source is on, the main control section moves the imaging optical system at a predetermined speed toward a predetermined position, and the sub control section moves the imaging optical system moved by the main control section while altering a moving speed, and interrupts it at a predetermined position.

The sub control section interrupts the imaging optical system at a predetermined position as described above, whereby the details of the control to be executed by the main control section are simplified, and accuracy required for the position control is lowered.

Accordingly, an inexpensive CPU is useable for the main control section, and the development of a program executed by it is facilitated. Starting time in the case the power source is turned on shortens because the main control section moves the imaging optical system. As a result, the manufacturing cost of the photographing apparatus can be reduced, and the starting time upon the power source being turned on can be shortened.

When the position of the imaging optical system is changed, and the imaging optical system moved by the main control section is moved further by the sub control section, the position can be accurately grasped, so that the position control of the imaging optical system is assured with high accuracy.

When the main control section moves the imaging optical system depending upon the position of the imaging optical system, the details of the control executed by the main control section can be simplified. The development of a system or a program of the whole photographing apparatus is facilitated owing to the simplification, while a CPU having a lower processing capability can be adopted for the main control section. Accordingly, the effect to reduce the manufacturing cost is ensured.

Although in the embodiment 1 according to the present invention the zoom drive voltage is gradually lowered in the lens barrel initialization processing II, it is not necessary to limit thereto for achieving the first object of the present invention. For example, the drive time of the lens barrel is useable for the quantity of the control for the lens barrel initialization processing I. In this situation, the sub-control section 118 draws out the lens barrel by a set time.

Although in the present embodiment 1 the position information of the lens barrel is received from the side of the sub-CPU, it is not necessarily so to receive it from the side of the sub-CPU, and it is also possible to detect it on the side of the main CPU independently.

As the circuit component to be connected through the OR circuit there are necessary a positive rotation OR circuit and a reverse rotation OR circuit, and an OR circuit for inputting the lens barrel position information for controlling the motor drive voltage control circuit 214 for use in brake drive. However, if it is assumed to execute only the first lens barrel initialization processing, only a positive rotation OR circuit is necessary as the circuit component to be connected through the OR circuit, and if the position information of the lens barrel may be inputted additionally, which can further reduce the circuit cost.

Embodiment 2

In the embodiment 1 of the present invention, when the power source is turned on, the main control section 112 forced the electronic switch 221 to output a control signal, whereby the sensor power source was turned on until the zoom lens 202 was interrupted at the photographing standby position.

In the present embodiment 2 of the present invention, within a time interval when the sensor power source is unnecessary to be turned on, the power source is turned off to save electric power.

Figure 18:
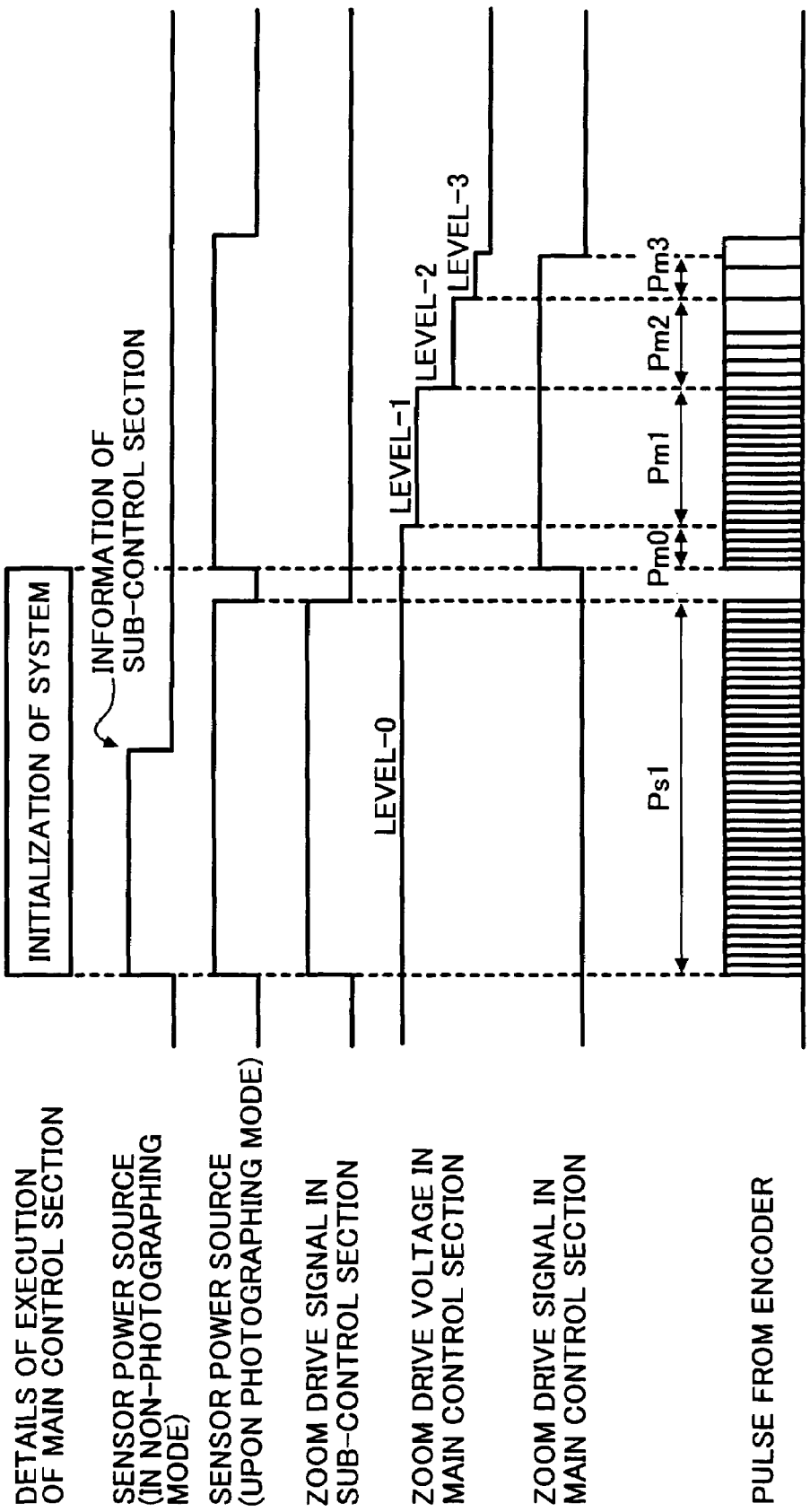

Referring to FIG. 18, there is provided a timing chart illustrating the operation of each section of the photographing apparatus 100 when the power source is turned on.

An outline of the operation executed by the sub-control section 118 and the main control section 112 after the main switch is turned on is the same as that in the embodiment 1 of the present invention.

The main control section 112 sets the drive voltage level to "Level-0" during the system initialization processing. Simultaneously, the main control section 112 outputs a control signal to the electronic switch 221, and drives the respective sensors 218, 219, and the encoder 200 before the sub-control section 118 outputs the zoom drive signal. Drive intervals of the sensor and the encoder 200 are indicated by high in a waveform level of the "sensor power source" in FIG. 18. "High" of the waveform level corresponds to "on" of the sensor power source, and "low" of the waveform level to "off" of the sensor power source.

The sub-control section 118 informs the main control section 112 of an operation mode instructed by the mode changeover switch during the time the main control section 112 executes the system initialization processing. The main control section 112 interrupts outputting of the control signal to the electronic switch 221 since drawing-out of the lens barrel 200 by the sub-control section 118 is not executed when the informed operation mode is the non-photographing mode other than the photographing mode, and interrupts at once the drive of the respective sensors 218, 219, and the encoder 200. More specifically, the sensor power source is turned off based upon the information from the sub-control section when the sensor power source is the non-photographing mode as illustrated in FIG. 18.

The main control section 112 turns off the sensor power source upon the operation mode being the photographing mode the sub-control section 118 interrupts the outputting of the zoom drive signal, and turns on the sensor power source when the outputting of the zoom drive signal is started.

As a result, the sensor power source is temporarily turned off until the main control section 112 starts its drawing-out since the drawing-out of the lens barrel 200 by the sub-control section 118 is finished.

In embodiment 2 of the present invention, the sensor power source is turned off in the time interval the sensor power source is unnecessary to be on, i.e., during the time interval the drawing-out of the lens barrel 200 is not performed since the time point the drawing-out of the lens barrel 200 is unnecessary. As a result, the entire electric power consumption of the photographing apparatus 100 is reduced, and the operable time of the entire camera is lengthened. It is herein noticed that the sensor power source of only one of the respective sensors 218, 219 may be turned off.

Figure 19:
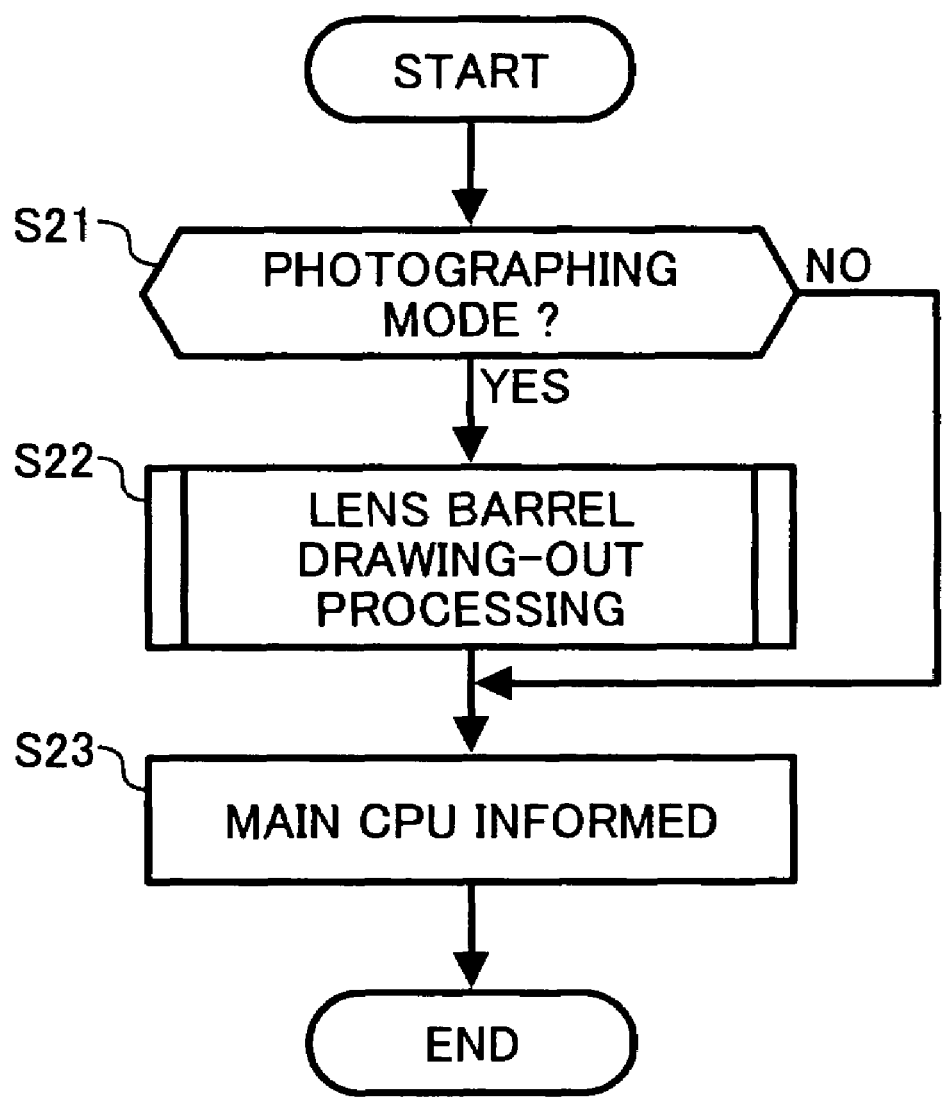
FIG. 19 is a view describing the embodiment 2 of the present invention, a simplified flow chart illustrating a flow of a processing executed by the sub-control section following the generation of an interrupt signal by the operation of the main switch.

Referring to FIG. 19 there is shown a flow of a processing executed by the sub-control section 118 based upon the generation of its interrupt signal. FIG. 19 is one obtained by simplifying the main switch interrupt processing illustrated in FIG. 10. The sub-control section 118, in step S21', judges whether the operation mode instructed by the position of the mode changeover switch is the operation mode or the photographing mode. When the operation mode is the photographing mode, YES is judged, and the control is transferred to step S22', where the lens barrel drawing-out processing for drawing out the lens barrel 200 is executed. In succession, in step S23', after the main CPU is informed of a processed result (including counted Psx) and an instructed operation mode, a series of the processing are finished.

In step S21', when NO is judged, the control skips to S22', and proceeds to step S23', where after the main CPU is informed of the instructed operation mode, a series of the processing are finished.

The zoom drive signal is outputted by executing the lens barrel drawing-out processing in step S22', and the outputted zoom drive signal is interrupted while awaiting the counts of the number of edges of the output signal of the encoder 200 become "Ps1", and actual counts Psx are sent to the main CPU.

Subsequently, the operation of the main drive control section 112 will be described below.

Figure 20:
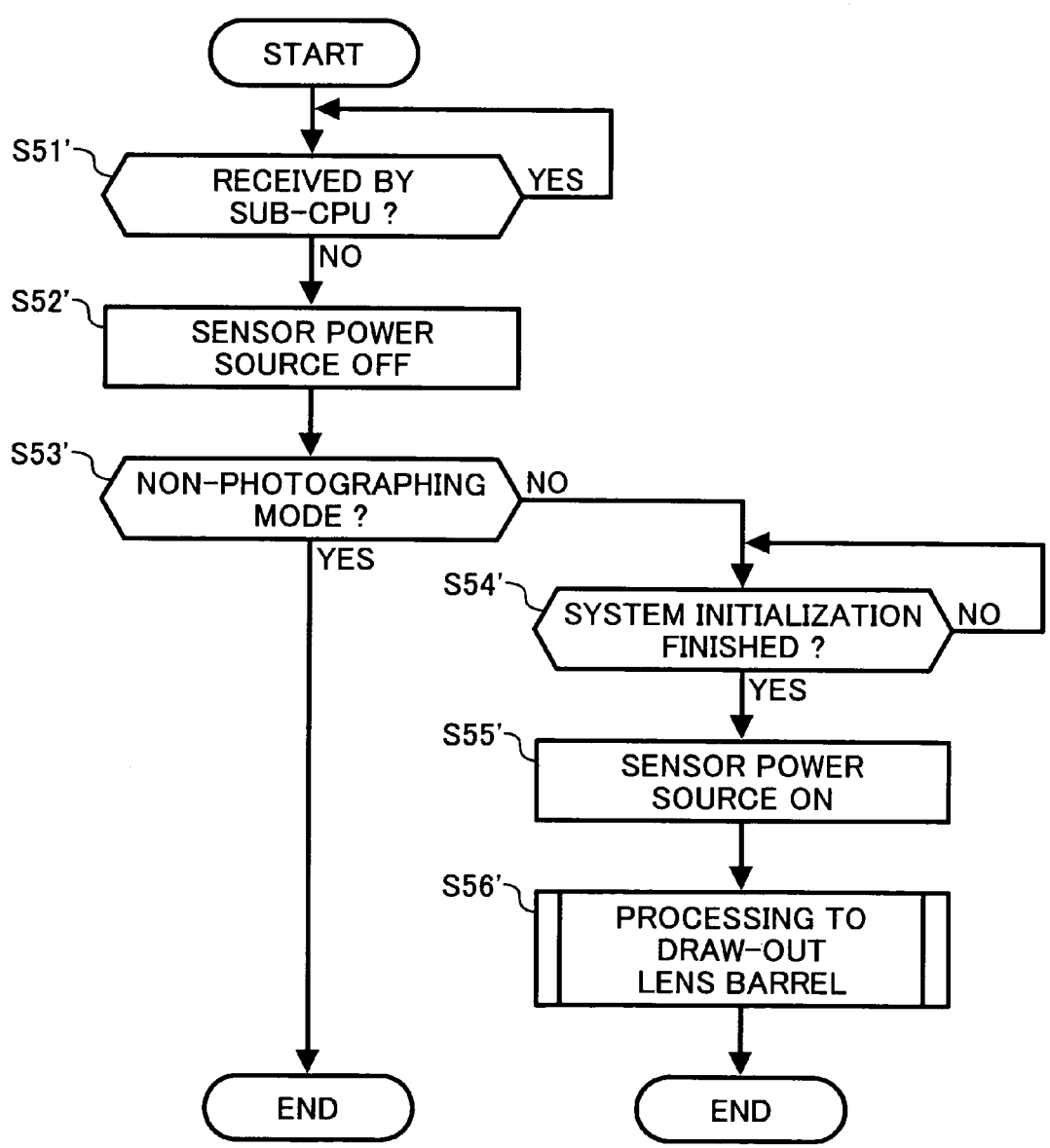
FIG. 20 is a view describing the embodiment 2 of the present invention, a flow chart of a flow of a processing executed by the main control section until the lens barrel is drawn out since data transmitted from the sub-control section is received.

Referring to FIG. 20, there is shown a flow of a processing executed by the main control section 112 until the lens barrel is drawn out since data sent in step S23' is received. Particularly noticing the processing associated with the on/off control of the sensor power source, processing executed by the main control section 112 are selected and a flow thereof is illustrated.

The main control section 112, in step S51', first awaits reception of data from the sub-control section 118. Data being an object of the reception at least includes data representative of the operation mode. The main control section 112, once receiving the date, proceeds to step S52' to turn the sensor power source off. When the sensor power source is turned off in the timing, the sensor power source is turned off in the timing illustrated in FIG. 18 irrespective of whether or not the operation mode is the photographing mode.

Successively, the main control section 112, in step S53', judges whether or not the operation mode informed from the sub-control section 118 is the non-photographing mode. When the operation mode is the non-photographing mode, YES is judged, where a series of the processing are finished. More specifically, when the operation mode is the non-photographing mode, the power source for the zoom position sensor 219, focusing position sensor 218, and encoder 220 is turned off.

The main control section 112, judges NO upon the photographing mode, and transfers to step S54'. The main control section 112, in step S54, waits until the execution of the system initialization processing is finished. Once the execution of the system initialization processing is finished, it transfers to step S55' to turn the sensor power source on. The main control section 112, in step S56', executes a lens barrel drawing-out processing "cameras cone II" for drawing the camera 200. Hereby, a series of the processing are finished.

In such a manner, the main control section 112, after turning on the sensor power source, draws out the lens barrel 200, and moves the zoom lens 202 by outputting the zoom drive signal. Accordingly, as illustrated in FIG. 18, the sensor power source is turned on in the timing the outputting of the zoom drive signal is started.

Details of the processing executed when the main control section 112 draws out the lens barrel 200 are the same as those illustrated by a flow chart illustrated in FIG. 15 in the embodiment 1 of the present invention, so that detailed description thereof will be omitted. The main control section 112, as illustrated in FIG. 18, after drawing out the lens barrel 200 to the photographing standby position, turns off the sensor power source at once.

Modified Embodiment

In the lens barrel drawing-out processing in step S56' illustrated in FIG. 20, if the power source is a small sized cell, its capacity is small, so that the zoom, focus, and mechanical shutter are prevented from being simultaneously driven. Therefore, after the zoom lens 202 is moved, the focusing lens 201 is moved.

More specifically, the control is execute in the order of the zoom, focusing, initialization, aperture, and shutter drive. In the present modified embodiment, an opposite order is followed, i.e., after the focusing lens 201 is moved, the zoom lens 202 is moved.

The construction of the photographing apparatus in the present modified embodiment is basically the same as that of the embodiment 2, and its operation is substantially the same, so that use is made of the symbols provided in the description of the embodiment 2 as they are, and the modified embodiment will be described.

Figure 21:
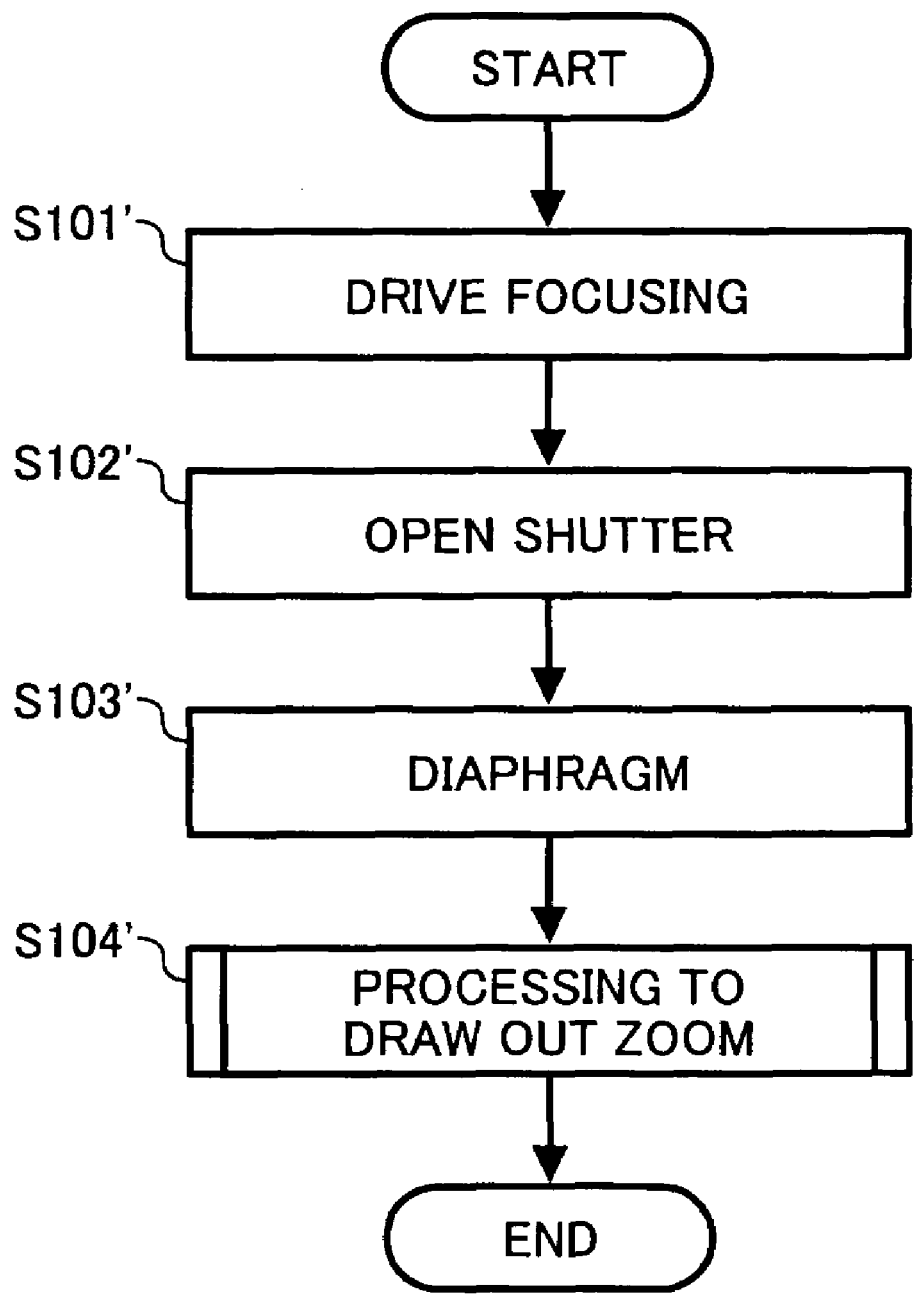
FIG. 21 is a view illustrating the embodiment 2 of the present invention, a flow chart of a lens barrel drawing-out executed by the main control section.

Referring to FIG. 21, there is illustrated a flow chart of the lens barrel drawing-out processing of the modified embodiment. The cameras cone drawing-out processing illustrated in FIG. 20 is a processing executed in step S56' in FIG. 20.

The main control section 112 first executes a processing of moving the focusing lens 201 in step S101', and then executes a processing of opening the shutter 102 in step S102'. The main control section 112 then executes an opening of proceeding to step S103' and opening an aperture, and finally executes a processing of moving the zoom lens 202 in step S104'.

As the respective lenses 201, 202 are moved in the foregoing order, before the movement of the zoom lens 202 is finished, an analog signal of a focused image can be outputted to the CCD 103. In other word, a through image displayed on the display section 106 can be displayed more rapidly in a focused state using an analog signal outputted by the CCD 1.

Referring to FIG. 22, there is provided a timing chart illustrating the operations of each section of the photographing apparatus 100 when the power source in the modified embodiment is turned on.

The main control section 112 executes a processing in step S104' in a time interval indicated by "lens barrel" in FIG. 22. More specifically, before the just-mentioned time interval, the focusing lens 201 is moved, and the shutter 102 is opened. Accordingly, a signal level of the focusing position sensor 218 changes from low to high in the timing indicated in FIG. 22. The display of the through image is started, fitting the starting of execution of the processing in step S104.

More specifically, the aperture and the shutter are opened between the first lens barrel initialization processing and the second lens barrel initialization processing.

Accordingly, the through image is provided to a user in an earlier timing. Hereby, apparent response for a user can be improved.

Although in the present modified embodiment there is not executed the on/off control for the sensor power source executed in the embodiment 2, the control may be executed together with the present control. Further, the on/off control for the sensor power source may be executed for a photographing apparatus not mounting the two control sections thereon.

In the aforementioned embodiment 2 of the present invention, the position detection section for detecting the position of the imaging optical system is started in its drive by the power source being turned on, and after conditions under which the imaging optical system should be moved are found not to be satisfied, it interrupts the drive at once. By executing the on/off control for the position detection section as such the position detection section can be driven only in a timer interval it should be driven. Electric power consumption in the entire photographing apparatus can be more reduced.

In the case where the drive of the position detection section is temporarily interrupted till the starting of the movement of the imaging optical system by the sub control section since the movement of the imaging optical system by the main control section is finished when the foregoing conditions are found to be satisfied, the electric power consumption can be more suppressed. In the case where the imaging optical system includes a movable zoom lens and focusing lens, when the zoom lends is adapted to be moved after the movement of the focusing lens is finished, a focused image can be displayed in an earlier stage provided that the photographing apparatus is one treating an image in the form of data such as a digital camera.

Although in the embodiment 2 of the present invention, the drive of the position detection section is started by the power source being turned on, and after the conditions under which the imaging optical system should be moved are found not to be satisfied, the drive is interrupted at once, a third control section may be provided, not the sub control section, which third control section starts the drive of the position detection section by the power source being turned on, and after the conditions under which the imaging optical system should be moved are found not to be satisfied, the drive is interrupted at once.

What is claimed is:

1. A photographing apparatus, comprising:
an imaging optical system configured to guide light from a subject;
a movement mechanism configured to move the imaging optical system;
a position detection section configured to detect the position of said imaging optical system;
a sub control section configured to begin moving said imaging optical system toward a predetermined position with the aid of said movement mechanism when a power supply is switched from off to on; and
a main control section configured to execute system initialization of the main control section when the power supply is turned on and to move said imaging optical system moved by said sub control section with the aid of said movement mechanism and interrupt a movement of the imaging optical system at said predetermined position,
wherein the sub control section is further configured to control the imaging optical system concurrently with the system initialization of the main control section;
the sub control section is further configured to judge on the basis of the position detected by the position detection section, when a power supply is turned on, whether the imaging optical system should be moved; and
the sub control section is further configured to move the imaging optical system with the aid of the movement mechanism in response to the judgment of the sub control section.

2. A photographing apparatus according to claim 1,
wherein said sub control section is further configured to move said imaging optical system toward said predetermined position at a predetermined speed, and
said main control section is further configured to move said imaging optical system while altering a moving speed of said imaging optical system.

3. A photographing apparatus according to claim 1,
wherein said main control section is further configured to judge whether the imaging optical system should be moved on the basis of the position of the imaging optical system detected by the position detection section, and move the imaging optical system based on the judgment with the aid of the movement mechanism.

4. A photographing apparatus according to claim 1,
wherein the main control section is further configured to move the imaging optical system moved by the sub control section with the aid of the movement mechanism after the position of the imaging optical system detected by the position detection section stops changing.

5. A photographing apparatus according to claim 1,
wherein said imaging optical system includes a zoom lens and a focusing lens, and
when the power supply is turned on, said main control section is configured to move the zoom lens toward a first predetermined position and the focusing lens toward a second predetermined position with the aid of the movement mechanism,
wherein a movement of the zoom lens is started after a movement of the focusing lens is finished.

6. A photographing apparatus according to claim 1, wherein the main control section includes an operating system, and the sub control section does not include an operating system.

7. A photographing apparatus according to claim 1, wherein the sub control section supplies and disconnects an electric current to the main control section.

8. A photographing apparatus, comprising:
an imaging optical system configured to guide light from a subject;
a movement mechanism configured to move the imaging optical system;
a position detection section configured to detect the position of said imaging optical system;
a sub control section configured to begin moving said imaging optical system toward a predetermined position with the aid of said movement mechanism when a power supply is switched from off to on; and
a main control section configured to execute system initialization of the main control section when the power supply is turned on and to move said imaging optical system moved by said sub control section with the aid of said movement mechanism and interrupt a movement of the imaging optical system at said predetermined position,
wherein the sub control section is further configured to control the imaging optical system concurrently with the system initialization of the main control section; and
wherein the main control section is further configured to start a drive of the position detection section when the power supply is turned on, judge whether conditions under which the imaging optical system should be moved are satisfied, and interrupt the drive of the position detection section when it is judged that the conditions are not satisfied.

9. A photographing apparatus according to claim 8,
wherein when it is judged that the conditions are satisfied, the main control section is further configured to temporarily stop the drive of the position detection section after the movement of the imaging optical system with the aid of the sub control section is finished until the movement of the imaging optical system is started by the main control section.

10. A photographing apparatus according to claim 9,
wherein said imaging optical system includes a zoom lens and a focusing lens movable with the aid of the movement mechanism, and
said main control section is further configured to move said zoom lens after a movement of the focusing lens is finished.

11. A photographing apparatus according to claim 8,
wherein said imaging optical system includes a zoom lens and a focusing lens movable with the aid of the movement mechanism, and
said main control section is further configured to move said zoom lens after a movement of the focusing lens is finished.

12. A photographing apparatus according to claim 8,
wherein said conditions include that the photographing mode is being set.

13. A photographing apparatus to convert photographed image data of a subject to digital data, comprising:
a main control section configured to control the whole apparatus;
an imaging device configured to image a subject;
a lens barrel section configured to hold a lens to image the subject onto the imaging device and take different positions upon a non-photographing state and upon a standby state for photographing;
an imaging section configured to convert a subject picture image data signal outputted from the imaging device to a digital data signal;
a digital picture image processing section configured to convert a digital data signal to a video signal;

a sub control section connected to the main control section, and configured to deliver information to and from the main control section;

a lens barrel position detection section configured to detect position information of the lens; and a switch section connected to said main control section or said sub control section, wherein when a power supply switch of the switch section is turned on, the sub control section starts a first lens barrel initialization processing to drive the lens barrel from a non-photographing position to a photographing standby position side and the main control section executes a system initialization of the main control section, and the main control section performs a second lens barrel initialization processing to drive the lens barrel to the photographing standby position after the first lens barrel initialization processing is started and after the system initialization of the main control section is finished.

14. A photographing apparatus according to claim 13, wherein said main control section detects the position information of the lens barrel, and performs the second lens barrel initialization processing based upon the position information of the lens barrel.

15. A photographing apparatus according to claim 13, wherein when the power supply switch of the switch section is turned on, said main control section performs a system initialization, and after completion of the system initialization, the main control section is informed of a result of the first lens barrel initialization processing including the position information of the lens barrel from the sub control section, and performs the second lens barrel initialization processing based upon the informed position information of the lens barrel.

16. A photographing apparatus according to claim 13, wherein said sub control section does not execute the first lens barrel initialization processing when the position state of the lens barrel that is detected at the time the power supply switch of the switch section is turned on does not exist at a predetermined position.

17. A photographing apparatus according to claim 13, wherein said lens barrel section further includes an aperture or a shutter to control a light exposure amount of a subject, and brings about the drawing or the shutter to a photographing standby state between the first lens barrel initialization processing by the sub control section and the second lens barrel initialization processing by the main control section.

18. A photographing apparatus according to claim 13, wherein while the first lens barrel initialization processing is executed by the sub control section, execution for controlling the lens barrel is switched to the second lens barrel initialization processing by the main control section.

19. A photographing apparatus according to claim 13, wherein said main control section is further configured to judge a switch state of the switch section when the power supply switch of the switch section is thrown, and when the switch state is a photographing mode, instruct the sub control section to execute the first lens barrel initialization processing, and thereafter start execution of a system initialization.

20. A photographing apparatus according to claim 13, wherein the sub control section is further configured to receive a control parameter for controlling the first lens barrel initialization processing by the sub control section from the main control section.

21. A photographing apparatus according to claim 13, wherein the sub control section is further configured to confirm a switch state of the switch section based on a parameter held in the sub control section just after the power supply switch of the switch section is thrown, and start the execution of the first lens barrel initialization processing when the switch state is a photographing mode.

22. A photographing apparatus according to claim 13, wherein said main control section is further configured to alter a control parameter to control the first lens barrel initialization processing by the sub control section.

23. A photographing apparatus according to claim 13, wherein the main control section includes an operating system, and the sub control section does not include an operating system.

24. A photographing apparatus according to claim 13, wherein the sub control section supplies and disconnects an electric current to the main control section.

* * * * *

UNITED STATES PATENT AND TRADEMARK OFFICE
CERTIFICATE OF CORRECTION

PATENT NO. : 7,652,715 B2  Page 1 of 1
APPLICATION NO. : 10/636849
DATED : January 26, 2010
INVENTOR(S) : Tatsutoshi Kitajima et al.

It is certified that error appears in the above-identified patent and that said Letters Patent is hereby corrected as shown below:

Column 27, line 44, change "drawing" to --aperture--.

Signed and Sealed this

Thirtieth Day of March, 2010

David J. Kappos
*Director of the United States Patent and Trademark Office*